United States Patent
Burak et al.

(10) Patent No.: US 8,118,674 B2
(45) Date of Patent: Feb. 21, 2012

(54) GAMING MACHINE HAVING A 3D DISPLAY

(75) Inventors: Gilbert J. Q. Burak, Lincolnwood, IL (US); Peter Dorn, Wood Dale, IL (US); Jacob C. Greenberg, Elgin, IL (US); Francisco J. Paz, Arlington Heights, IL (US)

(73) Assignee: WMS Gaming Inc., Waukegan, IL (US)

( * ) Notice: Subject to any disclaimer, the term of this patent is extended or adjusted under 35 U.S.C. 154(b) by 2951 days.

(21) Appl. No.: 10/400,239

(22) Filed: Mar. 27, 2003

(65) Prior Publication Data

US 2004/0192430 A1   Sep. 30, 2004

(51) Int. Cl.
*A63F 9/24* (2006.01)

(52) U.S. Cl. ........................................................ 463/32

(58) Field of Classification Search .................. 345/629; 348/51; 463/32

See application file for complete search history.

(56) References Cited

U.S. PATENT DOCUMENTS

| | | | |
|---|---|---|---|
| 1,063,622 A | 6/1913 | Treitel | |
| 4,197,671 A | 4/1980 | De Brouwer | 46/226 |
| 4,298,868 A | 11/1981 | Spurgeon | 340/755 |
| 4,457,580 A | 7/1984 | Klose | 350/6.91 |
| 4,517,558 A | 5/1985 | Davids | 340/700 |
| 4,875,144 A | 10/1989 | Wainwright | 362/103 |
| 5,057,827 A | 10/1991 | Nobile et al. | 340/755 |
| 5,152,529 A | 10/1992 | Okada | 273/143 R |
| 5,172,251 A | 12/1992 | Benton et al. | |
| 5,213,338 A | 5/1993 | Brotz | 273/460 |
| 5,316,303 A | 5/1994 | Trudeau et al. | 273/121 |
| 5,375,043 A | 12/1994 | Tokunaga | 362/31 |
| RE35,188 E | 3/1996 | Howard | 273/143 R |
| 5,580,055 A | 12/1996 | Hagiwara | 273/143 R |
| 5,652,666 A | 7/1997 | Florence et al. | |
| 5,717,416 A | 2/1998 | Chakrabarti | 345/31 |
| 5,793,918 A | 8/1998 | Hogan | 385/116 |
| 5,934,672 A | 8/1999 | Sines et al. | 273/143 R |
| 6,027,115 A | 2/2000 | Griswold et al. | 273/143 R |
| 6,038,188 A | 3/2000 | Akamatsu | 365/226 |
| 6,052,100 A | 4/2000 | Soltan et al. | 345/6 |
| 6,056,642 A | 5/2000 | Bennett | 463/20 |

(Continued)

FOREIGN PATENT DOCUMENTS

EP   0 789 338 A1   8/1997

(Continued)

OTHER PUBLICATIONS

Wikipedia, Voxel, http://en.wikipedia.org/w/index.php?title=Voxel.*

(Continued)

*Primary Examiner* — Corbett B Coburn

(74) *Attorney, Agent, or Firm* — Nixon Peabody LLP

(57) ABSTRACT

A gaming machine including a controller coupled to a 3D display that displays true 3D or virtual 3D imagery associated with a basic or a bonus wagering game. 3D displays can display true 3D imagery or virtual 3D imagery that is displayed in 2D but perceived by the viewer to be 3D. True 3D displays include a volumetric 3D display, a multi-layer display, and a holographic display. Virtual or stereoscopic displays include a lenticular display employing cylindrical or spherical lenslets, a parallax illumination display employing light lines to create a parallax effect, or non-autostereoscopic displays requiring a special viewing aid to complete the 3D effect.

6 Claims, 18 Drawing Sheets

U.S. PATENT DOCUMENTS

| | | | |
|---|---|---|---|
| 6,068,552 A | 5/2000 | Walker et al. | 463/21 |
| 6,072,545 A | 6/2000 | Gribschaw et al. | |
| 6,164,645 A | 12/2000 | Weiss | 273/138.2 |
| 6,252,707 B1 | 6/2001 | Kleinberger et al. | |
| 6,254,481 B1 | 7/2001 | Jaffe | 463/20 |
| 6,302,542 B1 | 10/2001 | Tsao | |
| 6,338,678 B1 | 1/2002 | Seelig et al. | 463/17 |
| 6,471,387 B1 | 10/2002 | Henshaw et al. | 362/555 |
| 6,492,963 B1 | 12/2002 | Hoch | 345/39 |
| 6,517,433 B2 | 2/2003 | Loose et al. | |
| 6,558,253 B1 | 5/2003 | DeSimone et al. | 463/20 |
| 6,577,286 B1 | 6/2003 | Jang | 345/31 |
| D480,961 S | 10/2003 | Deadman | |
| 6,906,762 B1 | 6/2005 | Witehira et al. | |
| 6,937,298 B2 | 8/2005 | Okada | |
| 7,095,180 B2 | 8/2006 | Emslie et al. | |
| 7,140,963 B2 | 11/2006 | Kojima | |
| 7,159,865 B2 | 1/2007 | Okada | |
| 7,160,187 B2 | 1/2007 | Loose et al. | |
| 2001/0031658 A1 | 10/2001 | Ozaki et al. | |
| 2002/0005826 A1 | 1/2002 | Pederson | 345/82 |
| 2002/0008676 A1 | 1/2002 | Miyazaki et al. | |
| 2002/0036648 A1 | 3/2002 | Putilin | |
| 2002/0065131 A1 | 5/2002 | Seelig et al. | 463/30 |
| 2002/0067467 A1 | 6/2002 | Dorval et al. | |
| 2002/0107066 A1 | 8/2002 | Seelig et al. | 463/20 |
| 2002/0173356 A1 | 11/2002 | Sakai | |
| 2002/0183109 A1 | 12/2002 | McGahn et al. | 463/20 |
| 2003/0032479 A1 | 2/2003 | LeMay et al. | 463/32 |
| 2003/0040358 A1 | 2/2003 | Rothkranz et al. | 463/20 |
| 2003/0234489 A1 | 12/2003 | Okada | |
| 2003/0236118 A1 | 12/2003 | Okada | |
| 2004/0014520 A1 | 1/2004 | Okada | |
| 2004/0029636 A1 | 2/2004 | Wells | 463/32 |
| 2004/0063490 A1 | 4/2004 | Okada | |
| 2004/0116178 A1 | 6/2004 | Okada | |
| 2004/0147303 A1 | 7/2004 | Imura et al. | |
| 2004/0150162 A1 | 8/2004 | Okada | |
| 2004/0152502 A1 | 8/2004 | Okada | |
| 2004/0166925 A1 | 8/2004 | Emori et al. | |
| 2004/0166926 A1 | 8/2004 | Adachi et al. | |
| 2004/0171418 A1 | 9/2004 | Okada | |
| 2004/0207154 A1 | 10/2004 | Okada | |
| 2004/0209666 A1 | 10/2004 | Tashiro et al. | |
| 2004/0209667 A1 | 10/2004 | Emori et al. | |
| 2004/0209668 A1 | 10/2004 | Okada | |
| 2004/0209670 A1 | 10/2004 | Adachi et al. | |
| 2004/0209671 A1 | 10/2004 | Okada | |
| 2004/0209672 A1 | 10/2004 | Okada | |
| 2004/0209678 A1 | 10/2004 | Okada | |
| 2004/0209681 A1 | 10/2004 | Emori et al. | |
| 2004/0209682 A1 | 10/2004 | Okada | |
| 2004/0214635 A1 | 10/2004 | Okada | |
| 2004/0214637 A1 | 10/2004 | Nonaka | |
| 2004/0219965 A1 | 11/2004 | Okada | |
| 2004/0224747 A1 | 11/2004 | Okada | |
| 2004/0224758 A1 | 11/2004 | Okada et al. | |
| 2004/0227286 A1 | 11/2004 | Tanimura et al. | |
| 2004/0227866 A1 | 11/2004 | Okada | |
| 2004/0229680 A1 | 11/2004 | Hoshino et al. | |
| 2004/0229686 A1 | 11/2004 | Tanimura et al. | |
| 2004/0266521 A1 | 12/2004 | Kojima | |
| 2005/0032571 A1 | 2/2005 | Asonuma | |
| 2005/0187003 A1 | 8/2005 | Adachi et al. | |
| 2005/0272500 A1 | 12/2005 | Tanimura et al. | |
| 2005/0282616 A1 | 12/2005 | Tanimura et al. | |
| 2005/0282617 A1 | 12/2005 | Sekiguchi et al. | |
| 2007/0004513 A1 | 1/2007 | Wells et al. | |

FOREIGN PATENT DOCUMENTS

| | | |
|---|---|---|
| EP | 0 989 531 A2 | 3/2000 |
| EP | 1 082 979 | 7/2000 |
| EP | 1 063 622 | 12/2000 |
| EP | 1 143 747 | 2/2001 |
| GB | 2 349 494 A | 11/2000 |
| JP | 05-022754 | 1/1993 |
| JP | 09138368 | 5/1997 |
| JP | 10177150 | 6/1998 |
| JP | 2000147695 | 11/1998 |
| JP | 2001197524 | 7/2001 |
| JP | 2002-279964 | 9/2002 |
| RU | 2 115 148 | 7/1998 |
| WO | WO 02/065192 | 8/2002 |
| WO | WO 02/089102 | 11/2002 |
| WO | WO 03/001486 | 1/2003 |
| WO | WO 03/023491 | 3/2003 |
| WO | WO 03/028824 A1 | 4/2003 |
| WO | WO 03/032058 | 4/2003 |
| WO | WO 03/040820 | 5/2003 |
| WO | WO 03/079094 A2 | 9/2003 |
| WO | WO 03/079094 A3 | 9/2003 |
| WO | WO 04/001486 | 12/2003 |
| WO | WO 04/001488 | 12/2003 |
| WO | WO 04/002143 | 12/2003 |
| WO | WO 2004/008226 | 1/2004 |
| WO | WO 2004/023825 | 3/2004 |
| WO | WO 2004/036286 | 4/2004 |
| WO | WO 2004/102520 | 11/2004 |
| WO | WO 2006/038819 | 4/2006 |
| WO | WO 2006/112740 | 10/2006 |

OTHER PUBLICATIONS

European Search Report for Application No. EP 04 00 7272, dated Oct. 21, 2005 (5 pages).
European Search Report for Application No. EP 04 00 7272, dated Feb. 15, 2005 (7 pages).
Brochure for "3RV," WMS Gaming Inc., 2 pages (undated).
Article for "The Pink Panther," Strictly Slots, p. 50 (Feb. 2001).
Article for "Flip Flop," Strictly Slots, p. 48 (Jun. 2000).

* cited by examiner

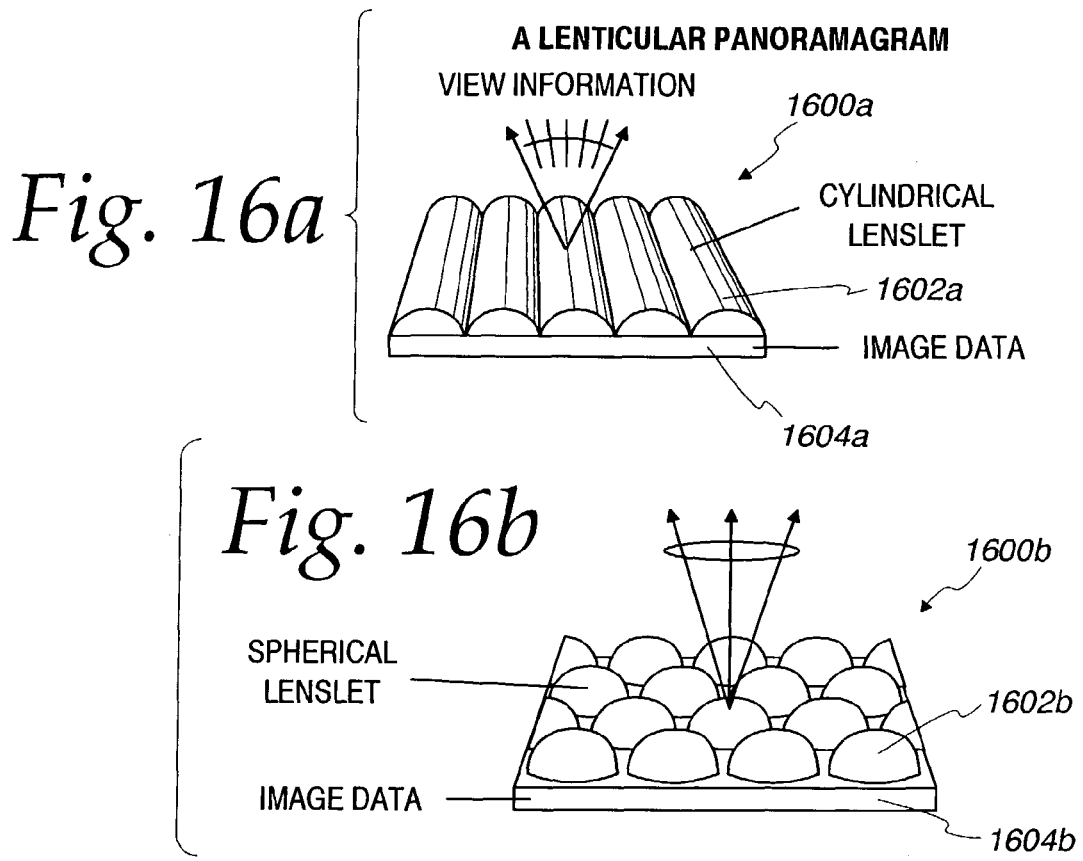
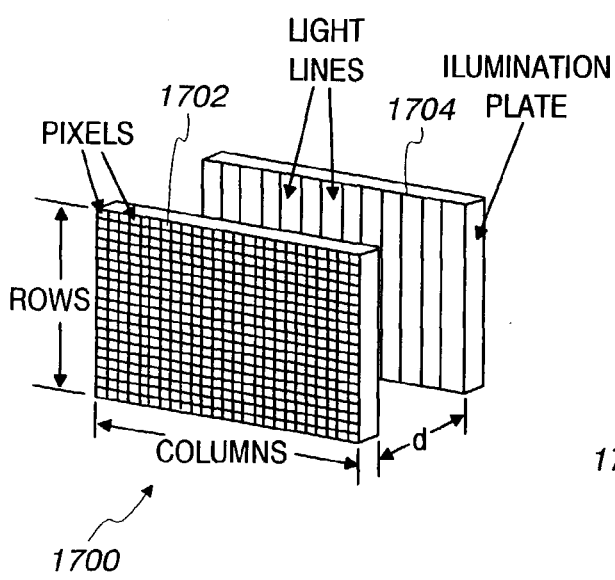
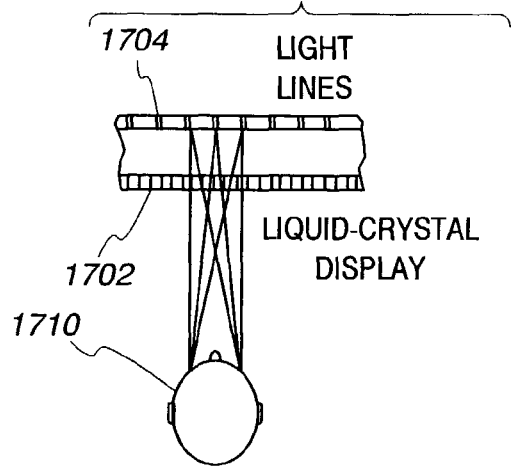

GAMING MACHINE HAVING A 3D DISPLAY

REFERENCE TO RELATED APPLICATIONS

This application is related to U.S. patent application Ser. No. 10/077,443 filed Feb. 15, 2002 and entitled "Simulation of Mechanical Reels On a Gaming Machine," and U.S. patent application Ser. No. 10/401,246 filed concurrently herewith and entitled "Gaming Machine Having a Persistence-of-Vision Display."

FIELD OF THE INVENTION

The present invention relates generally to gaming machines, and, more particularly, to a gaming machine having a 3D display.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

A typical gaming machine includes a display area controlled by a processor. In response to a wager, the processor randomly selects a game outcome from a plurality of possible game outcomes and then causes the reels to be stopped to display the selected game outcome. In a slot machine, for example, the selected game outcome is represented by certain symbols on the reels being in visual association with a display area. If the selected outcome corresponds to a winning outcome identified on a pay table, the processor instructs a payoff mechanism to award a payoff for that winning outcome to the player in the form of cash or credits.

A gaming machine must be exciting to play, but must also attract would-be players to place a wager with the gaming machine in the first instance. To this end, gaming machines typically include lamps or other visually decorative elements and produce sounds to lure players to place a wager and to enhance the overall playing experience so that players continue placing wagers. One type of prior-art slot machine includes mechanical symbol-bearing reels driven by stepper motors. The display area on this type of slot machine is fairly mundane. Several proposals to modify the appearance of the display area have been set forth. For example, the reels may contain electroluminescent elements that define one or more reel symbols, such as diamonds, cherries, or bars, where the characteristics of the reel symbols change based on inputs to the electroluminescent elements. In another proposal, the reel symbols are colored by backlighting the symbols with colored light bulbs or similar means.

Another type of prior-art gaming machine is a video-based slot machine that depicts the symbol-bearing reels on a video display. Traditional video-based slot machines allow for more flexibility in game design and multi-denominational play than mechanical reel-based slot machines offer and can depict complex and entertaining graphical images, animations, and play sequences that cannot be employed in mechanical slot machines. Some video-based slot machines incorporate two displays, one to display the basic game and the other to display a bonus game. Despite these flexibilities over mechanical reel-based slot machines, there are limitations. For example, traditional video-based slot machines can only display 2-dimensional images. Images that appear to be 3-dimensional may be rendered on a traditional LCD or CRT display, but these images are merely simulated and do not present a true stereoscopic effect to the viewer. Display technologies beyond the traditional LCD or CRT display exist today to create exciting visual effects in gaming environments. The present invention is directed to exploiting these technologies.

SUMMARY OF THE INVENTION

According to an embodiment of the present invention, a gaming machine for conducting a wagering game includes a controller for selecting a game outcome from a plurality of game outcomes and a 3D display for displaying the game outcome in true 3D or virtual 3D. In alternate embodiments, the 3D display for displaying the game outcome in true 3D is a volumetric 3D display, a multi-layer display with or without tracking of a viewer's position or angle, or a holographic display. In still further embodiments, the 3D display for displaying the game outcome in virtual 3D is an autostereoscopic display or a non-autostereoscopic display. Autostereoscopic displays include lenticular displays which include generally cylindrical lenslets or generally spherical lenslets disposed over a substantially transparent liquid crystal layer and parallax illumination displays which include a substantially transparent LCD layer and an illumination plate generating a plurality of light lines, the illumination plate being separated by a distance from the LCD layer and projecting the light lines through the LCD layer. In the embodiment where the 3D display is a non-autostereoscopic display, a viewing aid must be worn by the viewer to complete the 3D effect.

A method of conducting a wagering game on a gaming machine includes selecting a game outcome from a plurality of possible outcomes and displaying the game outcome on a 3D display, which may be any one of the foregoing displays.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. 16a is a diagrammatic sketch of an autostereoscopic lenticular display having cylindrical lenslets used in a gaming machine according to an embodiment of the present invention;

FIG. 16b is a diagrammatic sketch of an autostereoscopic lenticular display having spherical lenslets used in a gaming machine according to another embodiment of the present invention;

FIG. 17a is a diagrammatic sketch of an autostereoscopic display employing light lines used in a gaming machine of the present invention; and FIG. 17b is a top view of part of the autostereoscopic display employing light lines shown in FIG. 17a.

Figure 1:
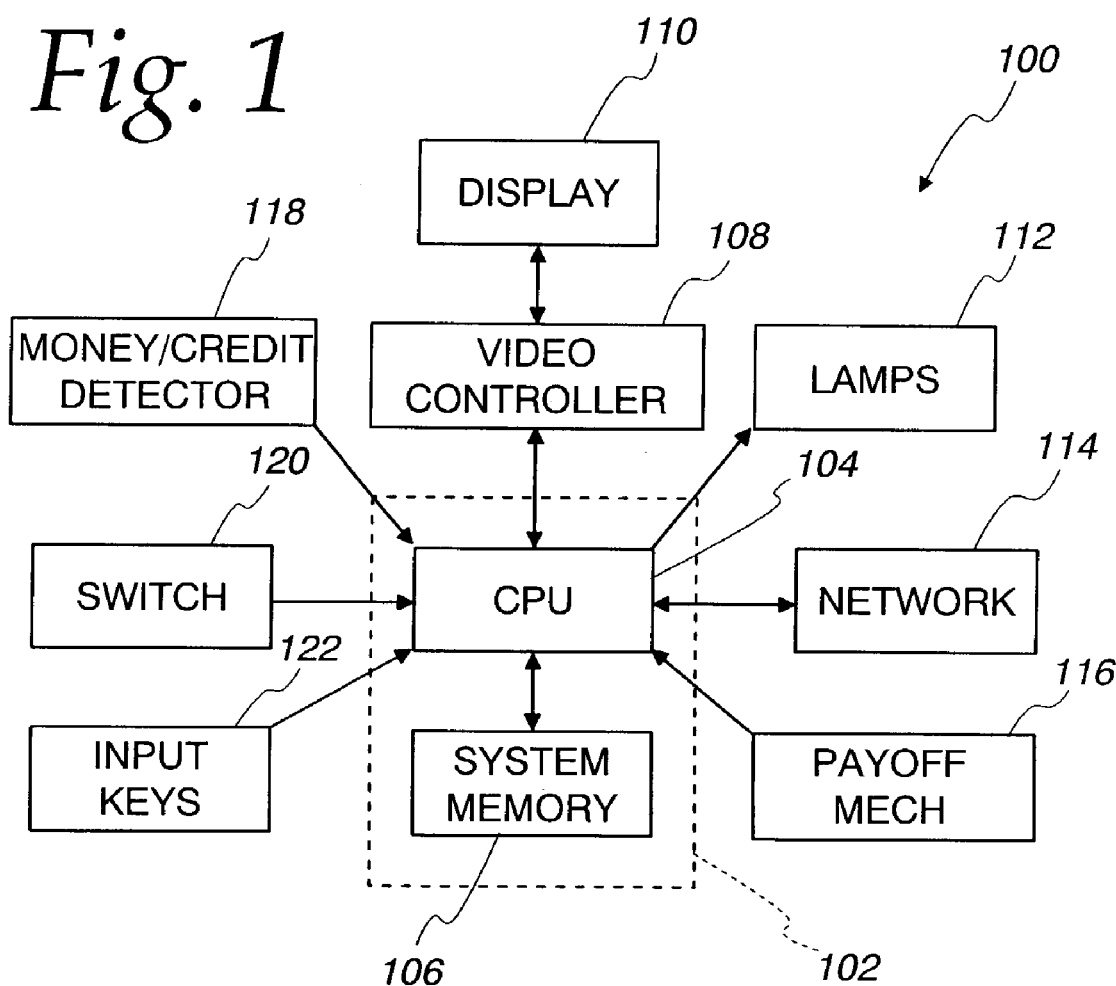
FIG. 1 is a functional block diagram of a control system suitable for operating a gaming machine in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The art of gaming machines and in particular video-based gaming machines continues to develop. The advent of display technologies which exploit a phenomenon known as "persistence of vision" and which are capable of displaying true 3D images or virtual 3D images brings exciting new possibilities to the art of gaming machines. The present invention is directed to incorporating these display technologies into a gaming machine to create a visually stunning environment which attracts frequent game play. These display technologies broadly fall into one of two categories.

The first category will be referred to as the persistence-of-vision ("POV") category. Persistence of vision relies on a "trick" by the human brain which actually retains an image for a fraction of a second longer than the eye actually sees it. By the time the brain loses its retention of the image, the next image is already being seen by the eye. Motion pictures rely on this phenomenon to create a seemingly continuous animation of images by rapidly projecting images 24 times per second onto a screen. In the brief moment of time between flashing images, the brain still retains the image the eye just saw, and no "flicker" effect is perceived. Displays in the POV category include volumetric 3D displays, 360-degree displays, and displays employing a rapidly moving structure such as a wand, hoop, or fan to create a POV effect.

In a volumetric 3D display, images are flashed rapidly onto a projection screen which is spinning around an axis. A circular projection screen can fill a spherical volume, and thus an image can be made to appear at any point within the volume.

A 360-degree display includes columns of spaced-apart display elements mounted about the surface of a cylinder which spins about an axis. By selectively turning these display elements on and off as the cylinder is spinning, a POV effect is created whereby an image is perceived to appear to the viewer around the entire surface of the display even though at any given instant of time, the actual image being seen by the eye resembles columns of changing Braille patterns.

A display employing a rapidly moving structure is distinct from a volumetric display in that display elements such as LEDs are mounted onto the rapidly moving structure itself and are selectively illuminated to create a POV effect. By contrast, in a volumetric display, images are projected onto the moving element to create the POV effect. The rapidly moving structure may be a wand or rod, a hoop, a fan, or a disc, to name a few.

The second category will be referred to as the 3D category. A 3D display may display images in true 3D or in virtual or stereoscopic 3D. True 3D displays actually display imagery in a volume or three-dimensional space. Each picture or display element in the 3D imagery is called a "voxel" which is the analog of a pixel in 2D imagery. Several types of displays may be characterized as true 3D displays. The volumetric 3D display mentioned above is one such display. The spinning screen fills a volume which is defined by voxels. Another true 3D display is a multi-layer video display which includes a number of transparent liquid crystal layers sandwiched together, each layer capable of displaying imagery across its surface. The sandwiched layers add a depth dimension, and imagery can be displayed in any location in the volume defined by the multiple layers. A third type of true 3D display is a holographic display which displays 3D imagery that appears to "float" in space.

Virtual or stereoscopic 3D displays do not actually display imagery in a volume or in a 3D space, but to the viewer, the imagery nonetheless is perceived to be 3D. Autostereoscopic displays create a virtual 3D effect without the need for special eyewear to complete the 3D effect, unlike non-autostereoscopic displays, which do require special eyewear. Examples of autostereoscopic displays include lenticular displays which are a type of parallax display and have cylindrical or spherical lenslets spaced over a liquid crystal layer. Parallax displays including lenticular displays rely on the different viewing angles of the right and left eyes, referred to as binocular disparity, to create a parallax effect. In lenticular displays, interleaved images are displayed by the liquid crystal layer and are emitted through the shaped lenslets so that the right and left eyes see slightly different 2D images. These 2D images are fused in the brain to form the 3D impression.

Another autostereoscopic display referred to herein as a parallax illumination display also exploits binocular disparity to display two slightly different 2D images which are perceived separately by the right and left eyes. A liquid crystal layer is placed in front of an illumination plate from which a group of bright, uniformly spaced vertical light lines are emitted. The right eye sees the light lines through the even columns of the liquid crystal layer, and the left eye sees the light lines through the odd columns, or vice versa.

It should be emphasized that the term "3D display" as used herein does not encompass traditional 2D displays such as LCD and CRT video displays that merely simulate 3D imagery through software. These traditional displays do not create a virtual 3D effect in that they do not rely on stereoscopic or autostereoscopic methodologies to create the visual perception of depth.

The gaming machines described next in varying and different embodiments utilize one or more of any combination of the foregoing types of displays. It is understood that the present invention is not limited to the specific displays mentioned herein, but rather encompasses any display which creates a POV effect or displays true or virtual 3D imagery.

I. Control System

Referring now to the drawings, and initially to FIG. 1, there is shown a functional block diagram of a control system 100 suitable for operating a gaming machine. Money/credit detector 118 signals a central processing unit ("CPU") 104 when a player has inserted money or played a number of credits. The money may be provided in the form of coins, bills, tickets, coupons, cards, etc. Then, the CPU 104 operates to execute a wagering game program that causes the display 110 to display imagery such as simulated symbol-bearing reels. The player may select a number of pay lines to play, an amount to wager, and start game play via a touch screen (not shown), input keys 122, or a switch 120, causing the CPU 104 to set the reels in motion, randomly select a game outcome, and then stop the reels to display symbols corresponding to the pre-selected game outcome. The wagering game may be slots, poker, keno, bingo, blackjack, or roulette, for example.

A video controller 108 coupled between the display 110 and the CPU 104 controls the imagery displayed on the display 110. The video controller 108 may be incorporated into either the display 110 or the CPU 104 or may be separate from the display 110 and the CPU 104. The display 110 may be any of the POV or 3D displays discussed herein.

A system memory 106 stores control software, operational instructions, and data associated with the gaming machine. In one embodiment, the system memory 106 comprises a separate read-only memory (ROM) and battery-backed random-access memory (RAM). However, it will be appreciated that the system memory 106 may be implemented on any of several alternative types of memory structures or may be implemented on a single memory structure. A payoff mechanism 116 is operable in response to instructions from the CPU 104 to award a payoff to the player in response to certain winning outcomes that might occur in the wagering game, which may include a basic game and one or more bonus games. The payoff may be provided via coins, bills, tickets, coupons, cards, etc. The payoff amounts are determined by one or more pay tables stored in the system memory 106. The gaming machine may be linked to other gaming machines or to an accounting system via a network 114.

The method of conducting a wagering game such as slots is described below. In general, game play is initiated by inserting money or playing a number of credits, causing the CPU 104 to activate a number of pay lines corresponding to the amount of money or number of credits played. In an embodiment, the player selects the number of pay lines by pressing a "Select Lines" key on a secondary display (not shown). The player then chooses the number of coins or credits to bet on the selected pay lines by pressing a "Bet Per Line" key on the secondary display.

After activation of the pay lines, the reels may be set in motion by touching a "Spin Reels" key or, if the player wishes to bet the maximum amount per line, by using the "Max Bet Spin" key on the secondary display. Alternately, other mechanisms such as, for example, a lever or pushbutton may be used to set the reels in motion. The reels may be shown on the secondary display or on the display 110. The CPU 104 uses a random number generator to select a game outcome (e.g., "basic" game outcomes) corresponding to a particular set of reel "stop positions." The CPU 104 then causes each of the video reels to stop at the appropriate stop position. Video symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In an embodiment, the pay table is affixed to the gaming machine 100 and/or displayed by the secondary video display or the display 110 in response to a command by the player (e.g., by pressing a "Pay Table" button). A winning basic game outcome occurs when the symbols appearing on the reels along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" button. In one implementation, the winning combinations start from the first reel (left to right) and span adjacent reels. In an alternative implementation, the winning combinations start from either the first reel (left to right) or the last reel (right to left) and span adjacent reels.

Included among the plurality of basic game outcomes are one or more start-bonus outcomes for starting play of a bonus game. The payoff amounts corresponding to certain outcomes of the bonus game are stored in system memory 106. A start-bonus outcome may be defined in any number of ways. For example, a start-bonus outcome occurs when a special start-bonus symbol or a special combination of symbols appears on one or more of the reels in any predetermined display position. The start-bonus outcome may require the combination of symbols to appear along a pay line, or may alternatively require that the combination of symbols appear anywhere on the display regardless of whether the symbols are along the pay line. The appearance of a start-bonus outcome causes the processor to shift operation from the basic game to a bonus game, which may, for example, be a scrolling indicia feature described in connection with FIG. 10 below.

Figure 10:
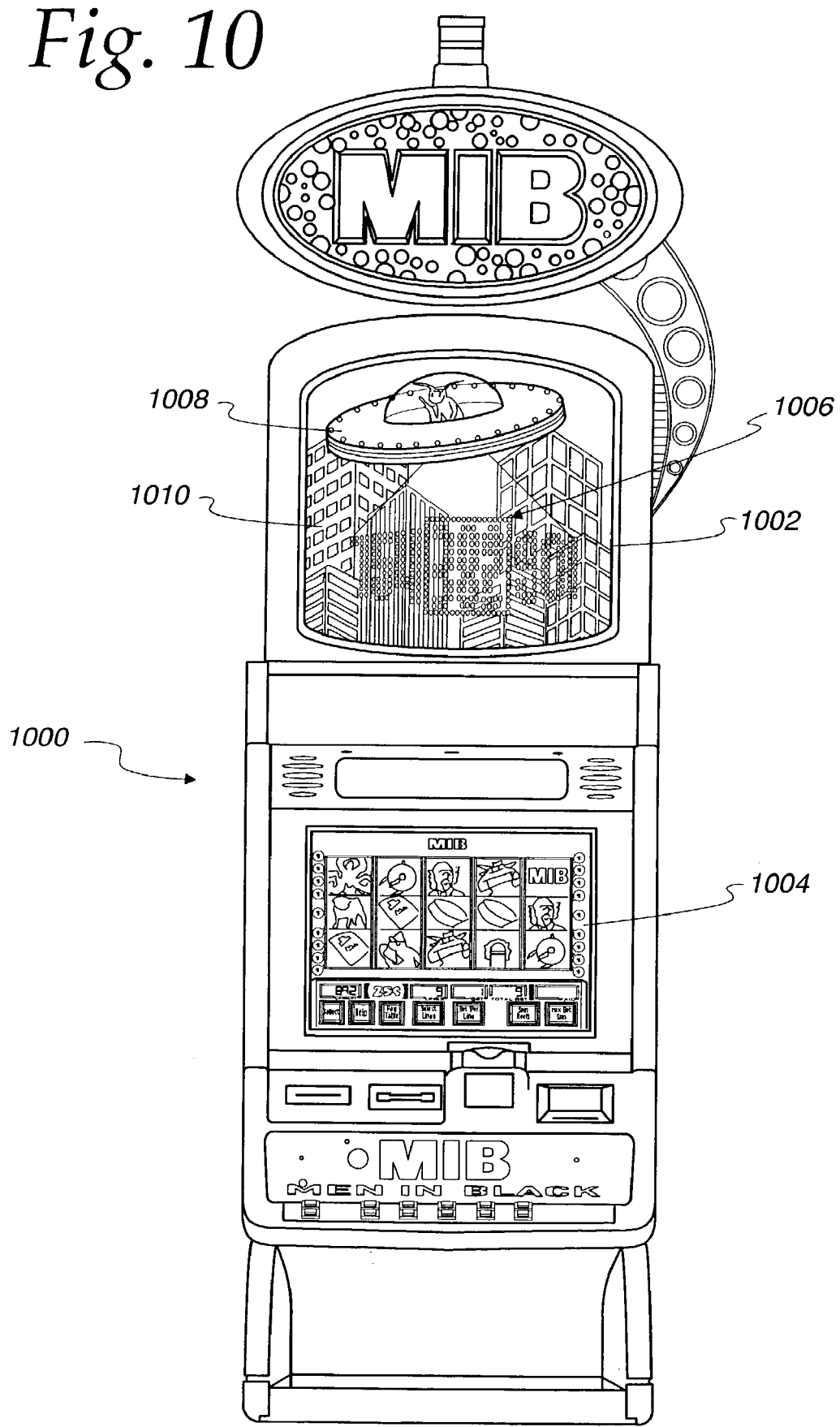
FIG. 10 is a front view of a gaming machine with a persistence-of-vision (POV) display displaying a scrolling indicia feature.

The gaming machine 100 may be "upright" such as shown in FIG. 10 in which a display is oriented vertically relative to the player. Alternatively, the gaming machine 100 may be a "slant-top" version in which a display is slanted at about a thirty-degree angle toward the player, such as shown in FIG. 2a.

II. Gaming Machine Including a POV Display
A. Volumetric 3D display

Figure 2A:
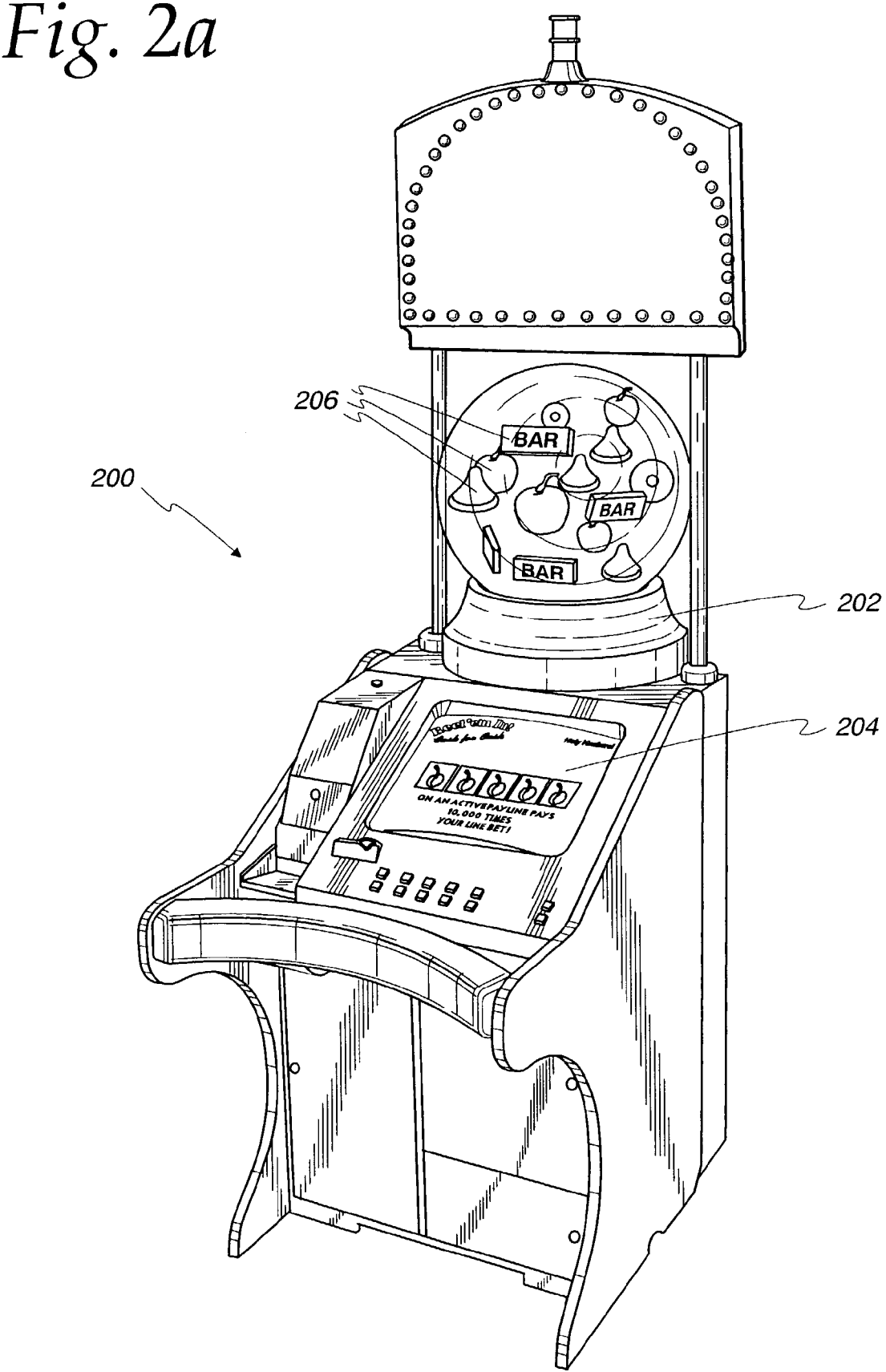
FIG. 2a is a perspective view of a gaming machine having a volumetric display displaying a basic game in accordance with an embodiment of the present invention.

FIG. 2a is a diagrammatic illustration of a perspective view of a gaming machine 200 including a volumetric 3D display 202 and a secondary display 204. Volumetric 3D displays are displays that produce volume-filling imagery. Such displays permit the generation, absorption, or scattering of visible radiation from a set of localized and specified regions within a physical volume.

Figure 2B:
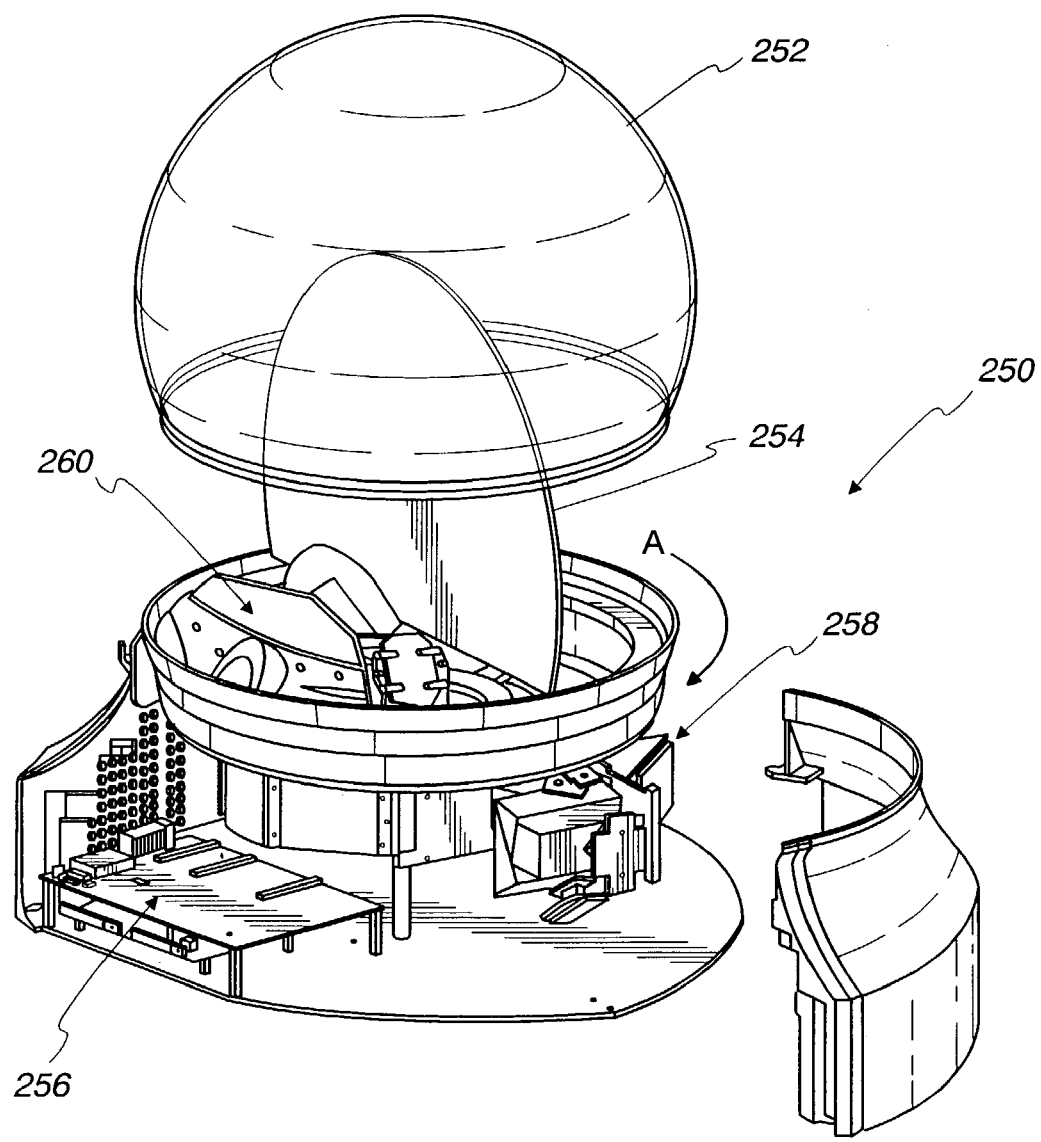
FIG. 2b is an exploded diagram of a volumetric display suitable for use in a gaming machine according to an embodiment of the present invention.

The volumetric 3D display 202 displays autostereoscopic imagery in a spherical volume by projecting a number of 2D images per second onto a rotating screen 254 shown in FIG. 2b. In an embodiment, the volumetric 3D display 202 projects thousands of 2D images per second onto the rotating screen, and the screen rotates at a rotational speed of at least 500 revolutions per minute. The volumetric 3D display 202 provides at least one slice per degree and a slice resolution of at least 500 pixels by 500 pixels. The volumetric resolution of the volumetric 3D display 202 to is at least about 100 million voxels. Because of its spherical shape, the volumetric 3D display 202 provides a viewing angle of approximately 360 degrees horizontal and approximately 270 degrees vertical. The 360-degree horizontal viewing angle permits the 3D imagery to be viewed from any point around the gaming machine 200, which will attract curiosity and will allow more would-be players to watch the game play without having to stand behind the player.

The imagery displayed by the volumetric 3D display 202 represent software-generated color 3D symbols 206 which are traditionally displayed as 2D symbols on a mechanical or simulated reel, such as fruit symbols and bar, double bar, and triple bar symbols. These 3D symbols 206 appear to the viewer to "float" inside of a transparent enclosure 252 surrounding the volumetric 3D display 202.

The secondary display 204 displays a help/information screen to inform the player of the game play rules or payoff amounts associated with certain game outcomes. The secondary display 204 optionally includes a touchscreen with which the player interacts to make selections during game play.

Volumetric 3D displays suitable for use with the gaming machine 200 are commercially available from Actuality Systems under the designation Perspecta™ and from Genex Technologies, Inc. under the designation VolumeViewer®.

FIG. 2b is an exploded view of the primary components of a volumetric 3D display 250 manufactured by Actuality Systems. The volumetric 3D display 250 generally includes a transparent enclosure 252, a projection screen 254, rasterization electronics 256, a projection engine 258, and relay optics 260. The projection engine 258 is based on the Texas Instruments™ Digital Mirror Device™ technology, which utilizes a MEMS-based reflective array to create single-bit-depth frames at approximately 5 kHz. The projection engine 258 is a 3-SLM (spatial light modulator) projection engine, which uses a color-mixing prism to combine R, G, and B image components with 1-bit depth each.

A standard high-pressure mercury arc lamp illuminates a 3-SLM projector via an integrator rod and condenser lenses. The image of the SLMs is projected onto a the projection screen 254 that approximates a Lambertian diffuser, and has approximately 50/50 reflectance and transmission properties. The image is projected through the center of an open-frame DC motor that rotates the final fold mirrors and the screen. Unfolding the optical path reveals that the SLMs throw an image at a 45° angle onto the screen. The relay optics 260 compensate to provide clear focus across the projection screen 254. The effects of keystoning and rotation of the SLM image in the plane of the projection screen 254 are reduced using real-time algorithms.

The CPU 104 shown in FIG. 1 sends 3D data to the rasterization electronics 256, which includes a graphics-processing processor. The rasterization electronics 256, in conjunction with the CPU 104, scan-converts the 3D data into coordinate system utilizable by the volumetric 3D display 250. The graphics-processing processor is a TMS320C6201™ DSP manufactured by Texas Instruments.

As the geometric or volume data is rasterized, it is stored in graphics memory (e.g., 3 Gbits of DDR SDRAM) in the rasterization electronics 256. The volumetric 3D display 250 is able to support higher-resolution imagery than is generated by the current projector system. Therefore, the graphics memory can be populated with 6 Gbits of RAM. Memory is partitioned into two volume buffers, each of which stores 198 slices of 768×768 imagery. A motor controller pages through memory in tight synchronization with the position of the rotating projection screen 254, which is rotated in direction A. The graphics memory is read out to the projector subsystem at (24 volumes/second)×(1024×768 pixels/slice)×(3 bits/pixel)×(198 slices/volume)=1.4 Gbytes/second. Full 1024×768 frames are loaded into the SLM even though only the central 768×768 is used.

Referring to the control system shown in FIG. 1, the video controller 108 corresponds to the rasterization electronics 256 which are coupled to the CPU 104 by a SCSI connection. Applications to display imagery on the volumetric 3D display 250 can be written in legacy or native format. A software development kit is available from Actuality Systems.

Figure 2C:
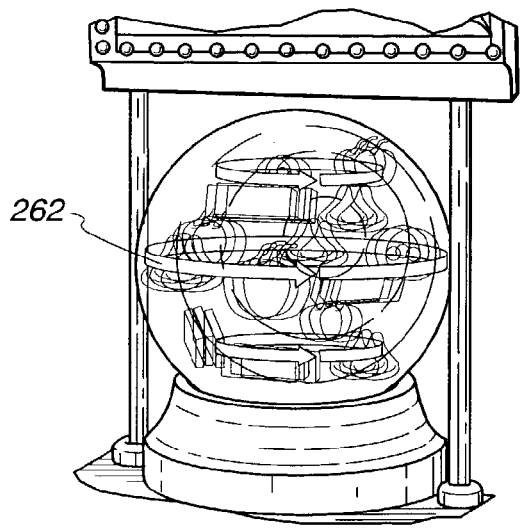
FIG. 2c is an illustration of the volumetric display shown in FIG. 2a displaying a plurality of reel symbols spinning in a horizontal direction.
Figure 2D:
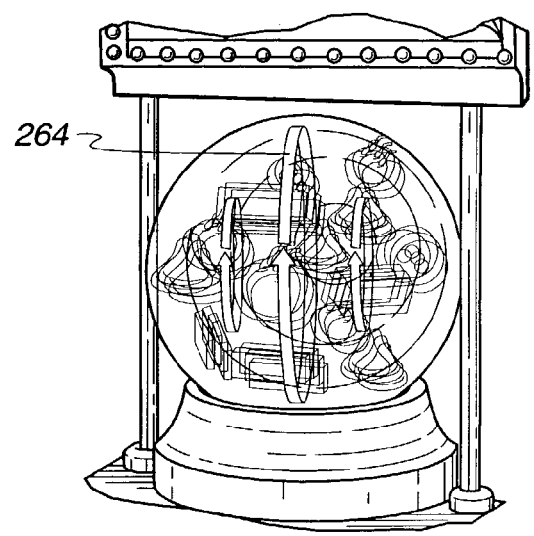
FIG. 2d is an illustration of a volumetric display displaying a plurality of reel symbols spinning in a vertical direction.
Figure 2E:
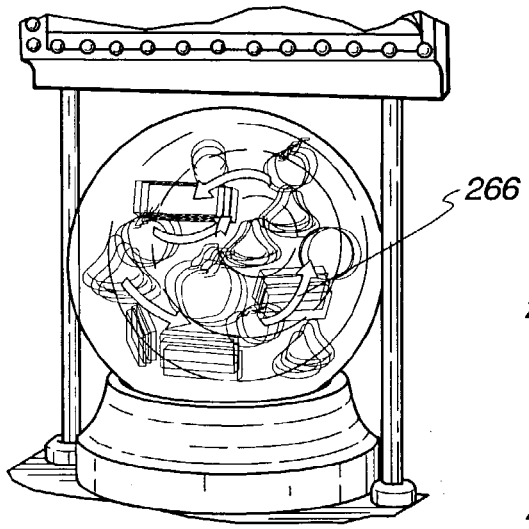
FIG. 2e is an illustration of a volumetric display displaying a plurality of reel symbols spinning in random directions.

Turning now to FIGS. 2c through 2f, the software-generated color 3D symbols 206 shown in FIG. 2a are set in motion through software stored in the system memory 106 by the CPU 104. In FIG. 2c, the 3D symbols 206 are set in motion in a horizontal direction 262. Note that the arrows in FIGS. 2c through 2e are shown for ease of discussion, and are not actually displayed on the volumetric 3D display 202. In FIG. 2d, the 3D symbols 206 are set in motion in a vertical direction 264. In FIG. 2e, the 3D symbols are set in motion in random directions 266 in an embodiment, and in another embodiment, are set in motion in predetermined and varied directions 266. Unlike traditional mechanical reels or simulated reels on a 2D display, when the 3D symbols 206 are set in motion, when they move to the background, they are actually still visible from another viewing angle relative to the volumetric 3D display 202. The movement of the 3D symbols 206 shown in FIG. 2e in a spatial volume cannot be recreated using traditional mechanical reels or simulated reels on a 2D display.

Figure 2F:
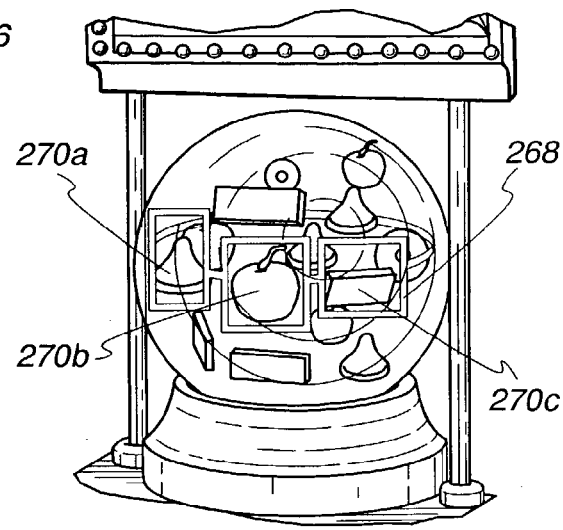
FIG. 2f is an illustration of a volumetric display displaying a pay line and a plurality of reel symbols at rest.

Eventually, the CPU 104 stops the 3D symbols 206 as shown in FIG. 2f and displays a pay line 268 which is actually viewable from a 360 degrees viewing angle. The 3D symbols 270a,b,c inside the pay line 268 indicate the game outcome, and a payoff or credit, if appropriate, is provided to the player.

Figure 3:
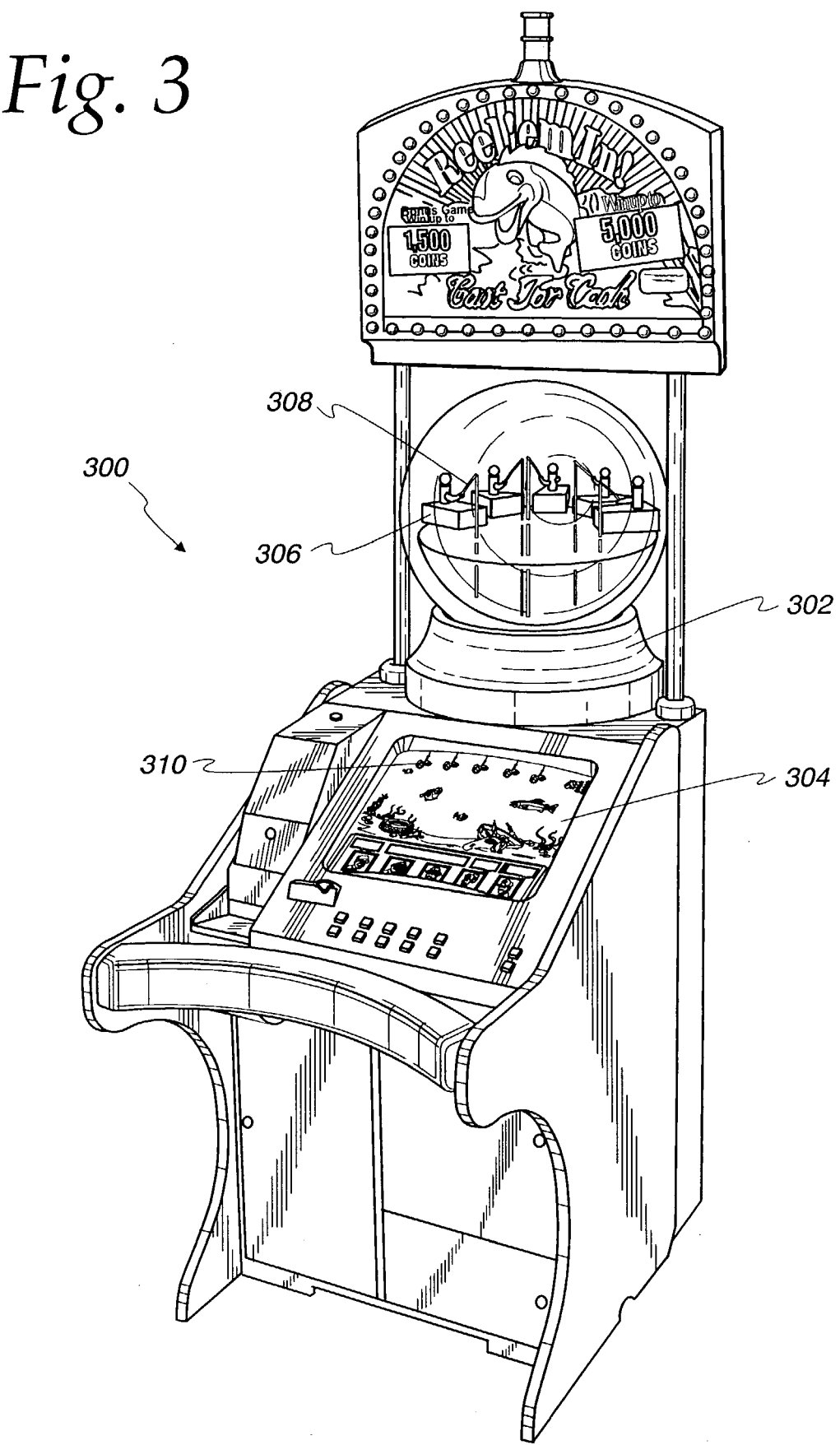
FIG. 3 is a perspective view of a gaming machine having a volumetric display displaying a bonus game in accordance with a specific embodiment of the present invention.

In contrast to the gaming machine 200 shown in FIG. 2a, which shows a basic game displayed on the volumetric 3D display 202, FIG. 3 shows a gaming machine 300 displaying a bonus game on a volumetric 3D display 302. The wagering game shown in FIG. 3 is based on the Reel'em In!® game produced by the assignee of the present invention. The volumetric 3D display 302 displays 3D imagery corresponding to a group of fisherman 306 sitting around a lake in boats. Each fisherman 306 holds a fishing line 308 at the end of which is a piece of bait 310. In this bonus game, bonuses are awarded depending on what combination of lake-dwellers and other objects displayed on a secondary display 304 are captured by the fishermen with their fishing lines 308. The volumetric 3D display 302 and the secondary display 304 are controlled by the CPU 104 to present a unified image to the viewer such that an action on the volumetric 3D display 302 is linked with an action on the secondary display 304. Thus, the fishing line 308 shown in the volumetric 3D display 302 appears to extend down to the bottom of the lake shown in the secondary display 304.

B. 360 Degree Display

Figure 4:
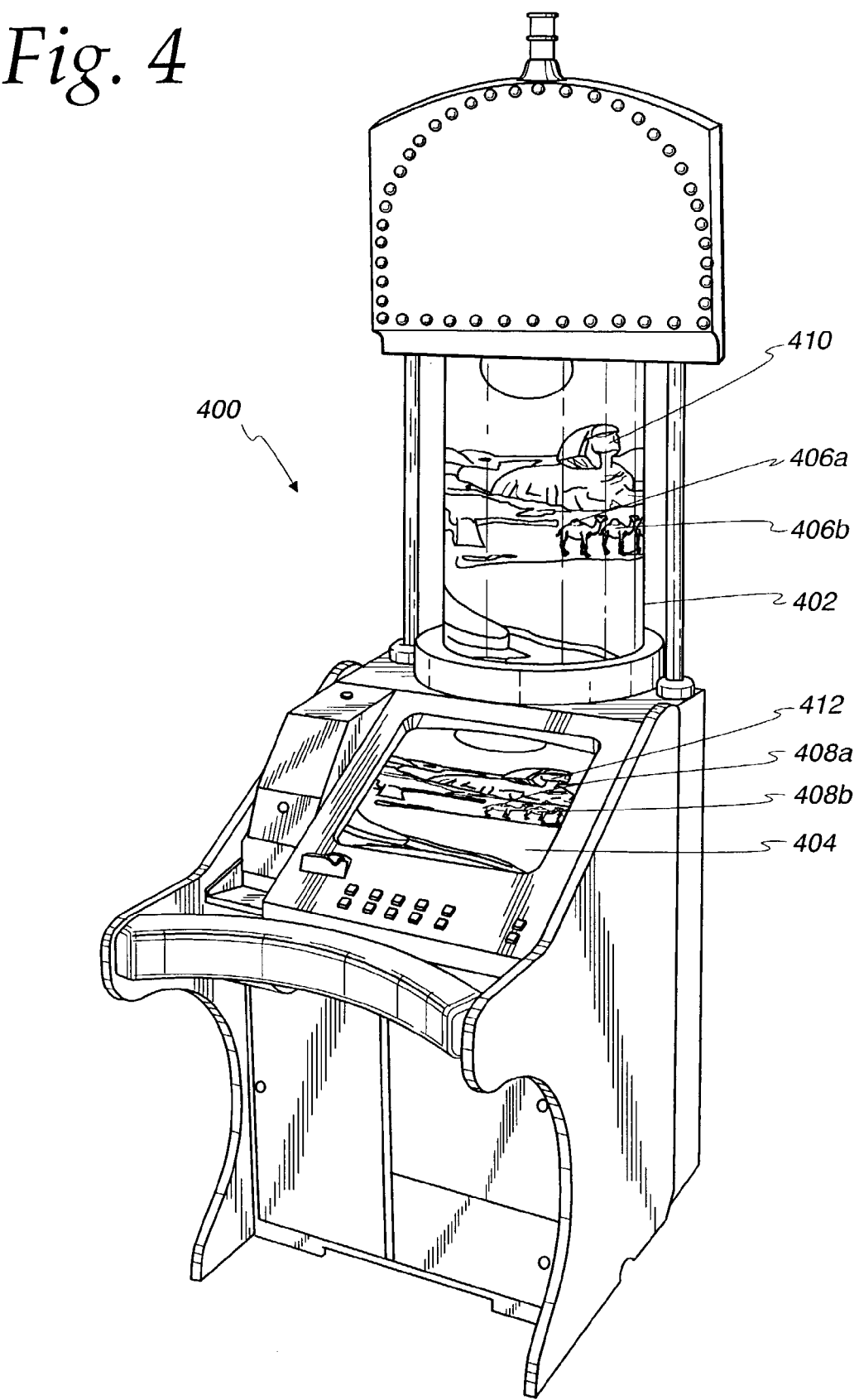
FIG. 4 is a perspective view of a gaming machine having a 360 degree display displaying a bonus game in accordance with an embodiment of the present invention.

FIG. 4 is a perspective view of a gaming machine 400 having a 360 degree display 402 that displays a bonus game according to an embodiment of the present invention. A 360 degree display is a type of POV display that exploits the brain's retention of an image longer than the eye actually perceives it to create 2D imagery about a 360 degree surface. The primary components and operation of a typical 360 degree display is described in connection with FIG. 5.

Figure 5:
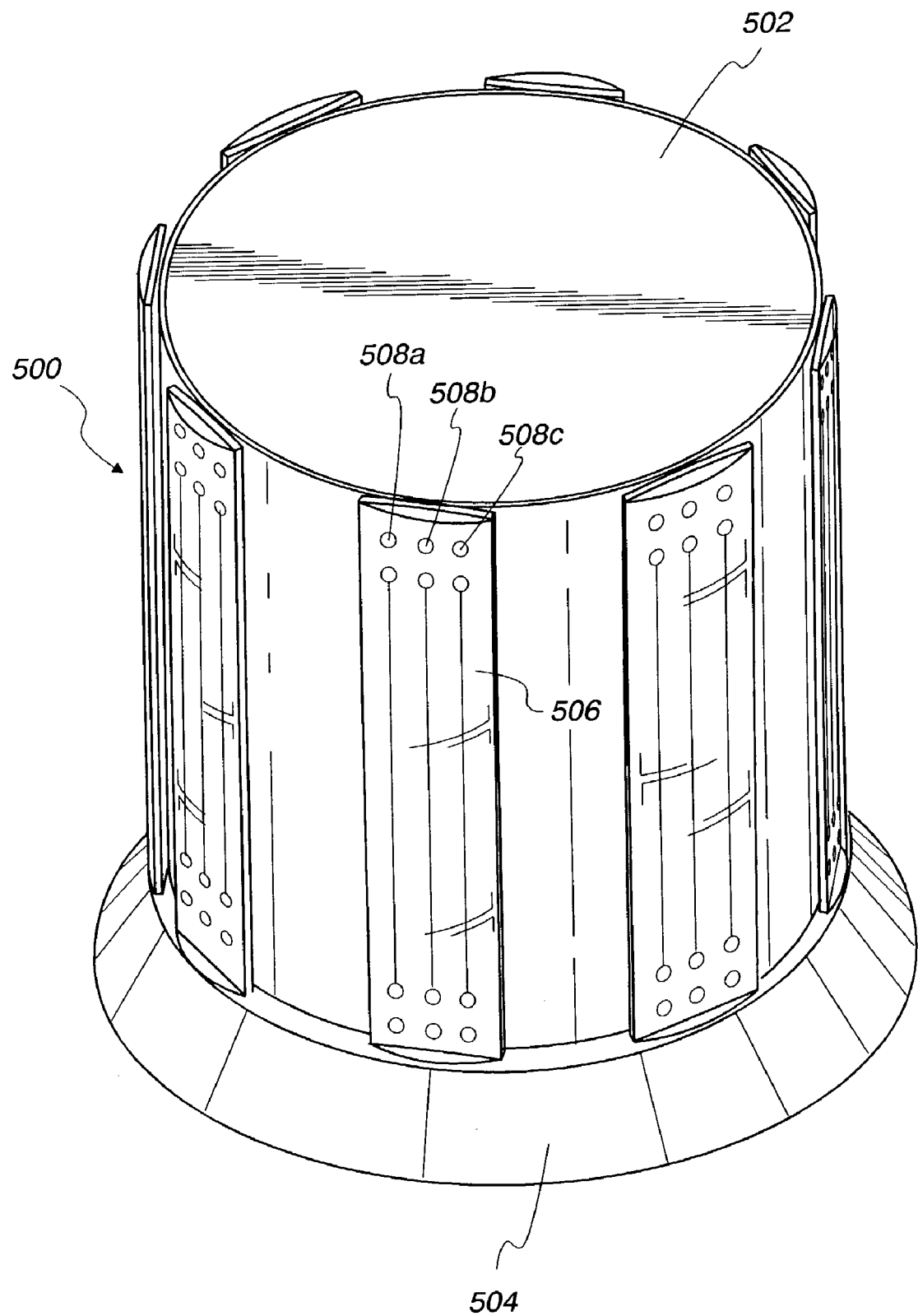
FIG. 5 is a perspective view of the 360 degree display shown in FIG. 4.

In FIG. 5, a 360 degree display 500 generally includes a base 504, a display body 502 rotatably mounted on the base 504 and multiple light emitting arrays 506 each equally spaced on a surface of the display body 502. Each of the light emitting arrays 506 is composed of multiple light emitting units, such as light emitting diodes 508 (LEDs). A set of three LEDs 508a,b,c are shown which emit red, green, and blue colors, respectively.

The rotatable display body 502 of the 360 degree display 500 is cylindrical in shape, and each of the light emitting arrays 506 is arranged axially and equally spaced on a wall of the cylindrical display body 502. The display body may be spherical, in which case each of the light emitting arrays would intersect the poles and be equally separated longitudinally on the outside of the spherical display body. Further, the display body 502 could be a roller body, in which case the light emitting arrays originate at the axis of rotation and are equally spaced radially on a planar surface of the roller display body.

The 360 degree display 500 uses far fewer LEDs than conventional LED displays and therefore could consume less power. Correction algorithms may be employed to assure color uniformity across the entire surface of the display 500 and to display up to 16.7 million colors, for example. The 360 degree display 500 provides a viewing angle of 360 degrees horizontal. In an embodiment, the light emitting arrays 506 rotate about the display body 502 at a rate of about 8000 RPMs.

360 degree displays are available from various display manufacturers including DynaScan Technology Corporation and Paltronics, Inc. Typical resolutions include 864×480 pixels on three screens, 864×512 on three screens, 480×720 on two screens, and 360×300 on two screens. The 360 degree display may be divided up into several screens, so that different images can be displayed on different sections of the display.

Returning to FIG. 4, a 360 degree display 402 displays imagery consisting of a background image 410 and image elements 406a,b corresponding to a bonus game feature of a wagering game. A secondary display 404 of the gaming machine 400 displays the same imagery that is displayed on the 360 degree display 402. A touchscreen overlays the secondary display 404 to enable the player to select objects displayed on the 360 degree display 402 by touching the corresponding object shown on the secondary display 404. Thus, the background image 410 of the 360 degree display 402 corresponds to background image 412 on the secondary display 404, and image elements 406a,b correspond to image elements 408a,b on the secondary display 404. The imagery shown on the 360 degree display 402 may wrap all the way around the display 402, or different imagery may be displayed on a section of the display 402 which is not viewed by the player facing the secondary display 404.

Figure 6A:
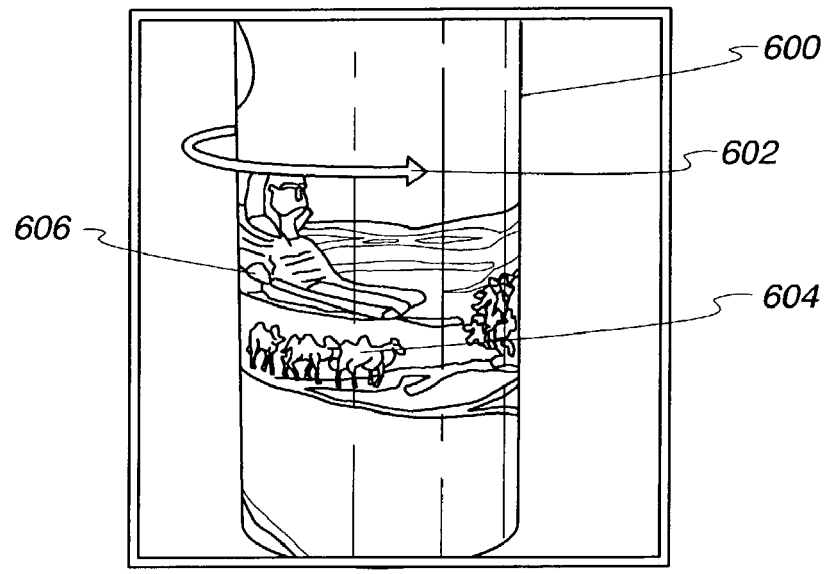
FIG. 6a is an illustration of a 360 degree display displaying image elements on a bonus game moving in a horizontal direction.

In FIG. 6a, a background image 606 and image elements 604 are displayed by a 360 degree display 600. Either the background image 606 or the image elements 604 are made to appear as if they are moving in a direction 602 shown as an arrow for ease of illustration. Thus, the background image 606 or image elements 604 may appear to scroll across the viewer's field of vision. As the imagery is scrolled, new imagery appears in the direction of movement.

For example, the bonus game shown in FIGS. 4 and 6a represents a desert scene depicting various images such as a sphinx, camels, and other items. The bonus game is triggered when a predetermined combination of reel symbols appear on a pay line during a basic game shown on the secondary display 404. Note that while the basic game is being played, help or game play information may be displayed on the 360 degree display. During the bonus game, the desert scene imagery is displayed on the 360 degree display 402. The player is instructed to snap a photo of various image elements such as image elements 406a,b, by touching the corresponding image element shown on the secondary display 404, as the imagery scrolls by such as shown in FIG. 6a. Depending upon the image element selected or "photographed," the player is awarded credits or other bonuses.

Figure 6B:
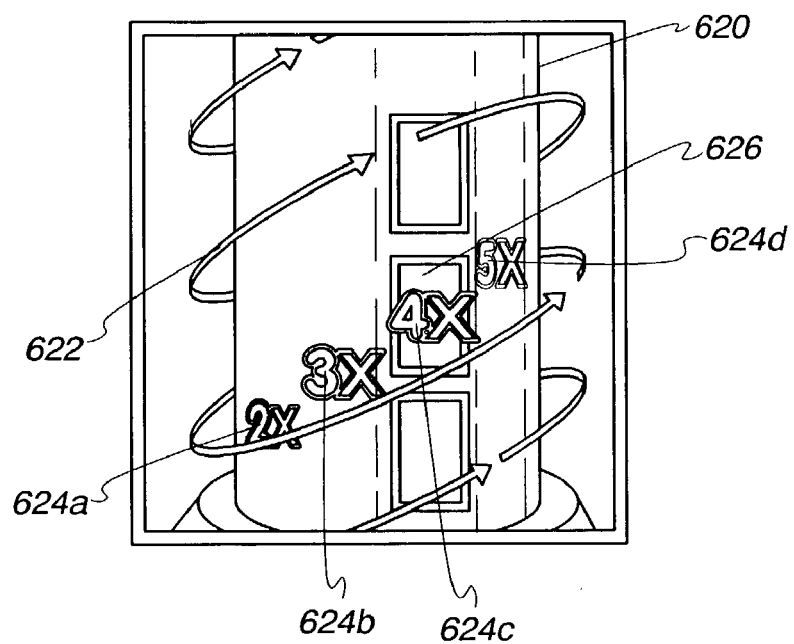
FIG. 6b is an illustration of a 360 degree display displaying a multiplier feature of a gaming machine according to an embodiment of the present invention.

FIG. 6b shows a multiplier feature of the game featured in FIGS. 4 and 6a. A plurality of multiplier elements 624a,b,c,d are displayed on a 360 degree display 620 to appear as if they are spiraling upwards like the stripes on a barber pole in the direction indicated by arrows 622. The multiplier elements 624 scroll past a box 626, and, in an embodiment, the player must press a "Stop" button or touch a designated area on a secondary display to stop the scrolling. Whatever multiplier element 624c, if any, is present inside the box 626 when the player stops the scrolling represents the amount by which the player's award will be multiplied. In another embodiment, the scrolling stops when a predetermined event occurs on the secondary display 404, and the player is awarded all of the multiplier values shown in the three boxes shown in FIG. 6b.

Figure 7:
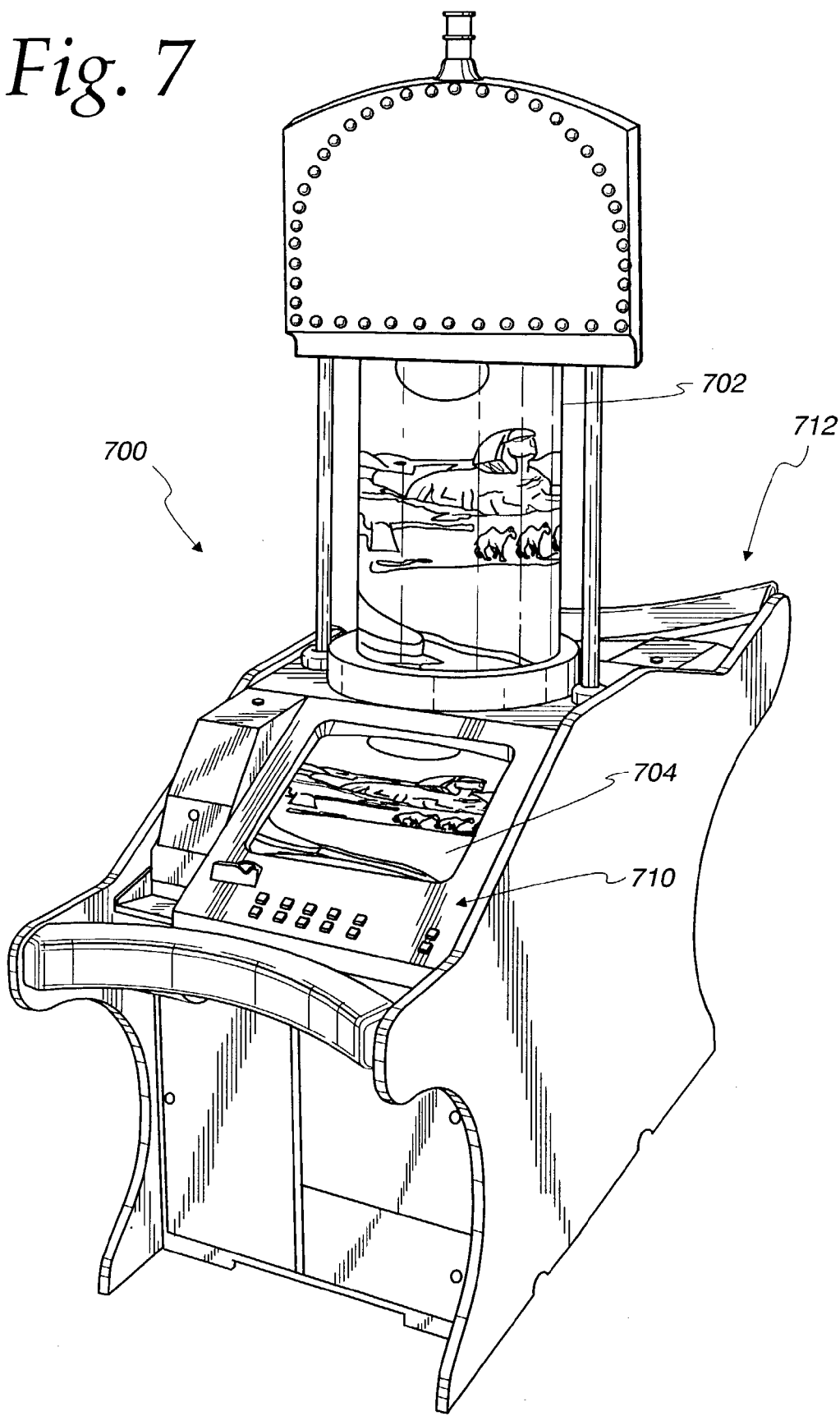
FIG. 7 is a perspective view of a two-player gaming machine with a 360 degree display according to an embodiment of the present invention.

FIG. 7 illustrates a dual-player gaming machine 700 including a first player station 710 and a second player station 712 situated about a 360 degree display 702. The first player station 710 and the second player station 712 may be networked together to enable a two-player wagering game, for example, or may be operable independently of one another, exploiting the 360 degree viewing angle of 360 degree displays. A basic game or a bonus game is displayed on the 360 degree display 702. In another embodiment, a volumetric 3D display is employed instead of the 360 degree display 702.

Figure 8:
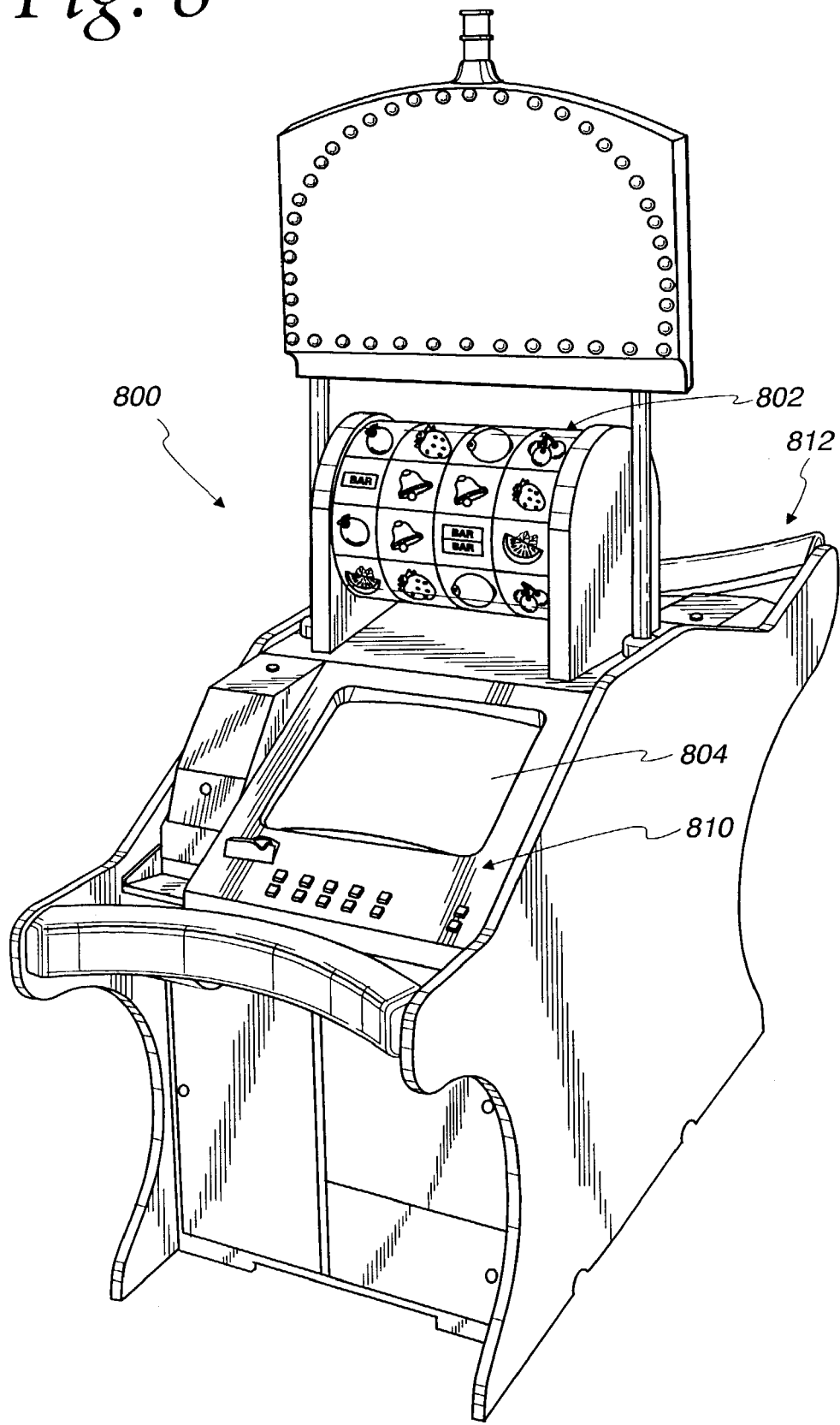
FIG. 8 is a perspective view of a two-player gaming machine with a 360 degree display mounted horizontally to simulate spinning reels in a basic game.

FIG. 8 is a perspective view of a dual-player gaming machine 800 including a first player station 810 and a second player station 812 situated about a 360 degree display 802 mounted transversely to display a symbol-bearing reel of a wagering game which can be viewed by two players situated at their respective player stations 810, 812. The first player station 810 includes a secondary display 804 for displaying help or game information, a basic game, or a bonus game. The second player station 812 also includes a secondary display (not shown). The player stations 810, 812 may be networked together to enable a two-player wagering game, or may be operable independently of one another. Because software controls what is displayed on the 360 degree display 802, any number of reels can be shown, such as three or five.

Figure 9A:
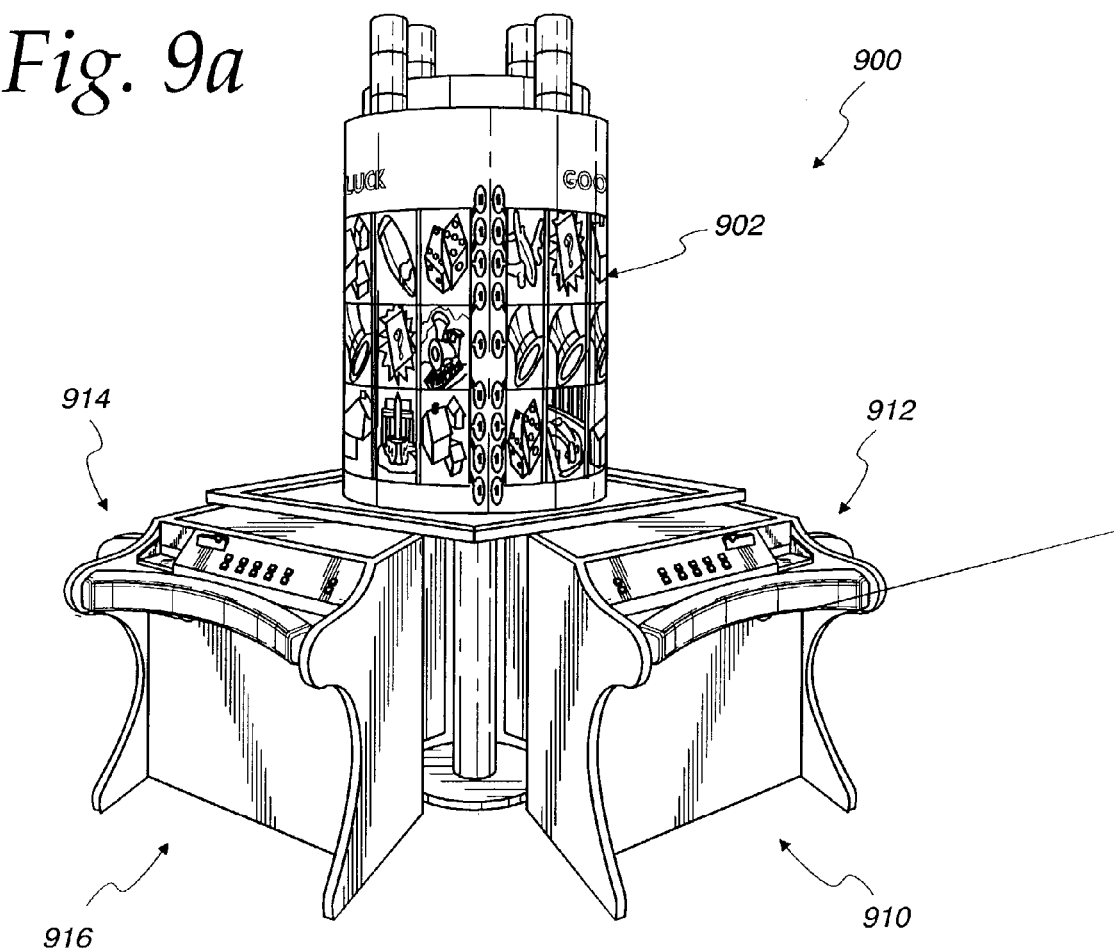
FIG. 9a is a perspective view of a four-player gaming machine including a 360 degree display divided into quadrants and displaying a basic game according to an embodiment of the present invention.
Figure 9B:
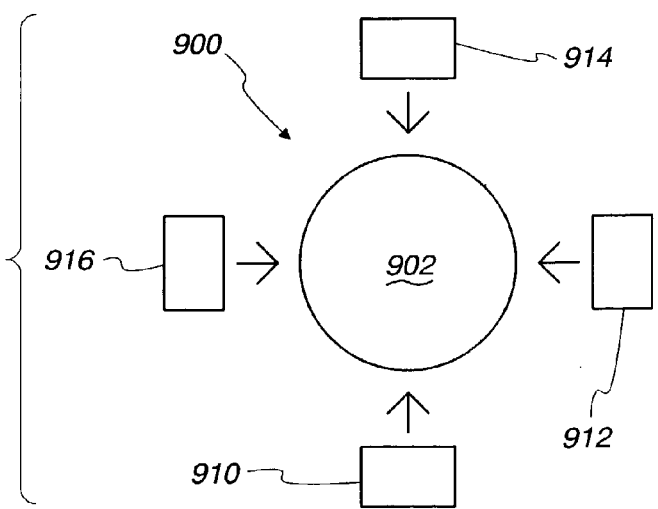
FIG. 9b is a diagram showing the positions of the four player stations shown in FIG. 9a relative to the 360 degree display.

FIG. 9a extends the number of player stations from two as shown in FIG. 7 to four. FIG. 9b is a functional block diagram of a four-player gaming machine 900 including a 360 degree display 902 about which a first player station 910, a second player station 912, a third player station 914, and a fourth player station 916 are situated. The 360 degree display 902 is divided into four screens, each player station viewing one screen or a quarter of the 360 degree display 902 and operable independently of the other player stations. In an embodiment, the player stations may include a secondary display (not shown). In an alternate embodiment, a volumetric 3D display is employed instead of the 360 degree display 902. Both volumetric 3D displays and 360 degree displays have horizontal viewing angles of about 360 degrees, making them particularly suitable for multi-player wagering video games.

C. Display Employing Rapidly Moving Structure

Another type of POV display is a display employing a rapidly moving structure such as a wand, a hoop, a fan, a disc, and so forth having lighting elements, such as LEDs, disposed about a periphery of the rapidly moving structure. The movement of the moving structure may be cyclical, orbital, horizontal, vertical, arced, circular, or rotational, for example.

A first type of rapidly moving structure is a wand, which is cylindrical or polygonal in shape and is capable of quick cyclical or orbital movement, horizontal movement, movement in an arc, or circular rotation on a plane, for example. The wand has a series of lighting elements such as LEDs or LCDs disposed about its periphery in columns. These lighting elements are controlled by the CPU 104, and are capable of illuminating in any pattern in quick succession. The lighting elements may have 32 to 1024 pixels or more, and may be arranged in one to three or more columns.

When the wand is set in motion, the selective illumination of the lighting elements combined with the movement of the wand creates a translucent image. By manipulating the illumination pattern of the lighting elements, all manner of images can be made to appear such as, for example, still and motion pictures, stationary and moving text. Indeed, the wand can display any image which a standard 2D video display is capable of displaying, yet uses far fewer lighting elements and therefore less power. In addition, when set in motion, a rapidly moving structure becomes translucent, enabling imagery to be viewed through the rapidly moving structure.

Because a rapidly moving structure can display any image a traditional 2D display is capable of displaying, the rapidly moving structure may be used to display any display aspect of a gaming machine, including a video reel, a basic game, a bonus game, messages during game play, help or game information, and so forth, or it may be incorporated into the top box art found on gaming machines, such as a wand in the hand of a sculpted wizard.

In an embodiment, a rapidly moving structure such as a wand may be disposed in front of a set of mechanical reels. Because the rapidly moving structure is translucent, the mechanical reels will be visible through the rapidly moving structure while it is in motion. In this embodiment, animated overlays can be displayed by the rapidly moving structure while the reels spin, or animations can be displayed when certain winning symbol combinations are present.

Displays employing rapidly moving structures are commercially available from at least GCDC Marketing, Inc. in sizes ranging from 6 inches to 24 feet.

FIG. 10 is a front view illustration of a gaming machine 1000 including a top display assembly 1002 and a secondary display 1004. The top display assembly 1002 includes an enclosure inside of which a rapidly moving structure displays a series of numbers 1006 underneath the spaceship 1008 shown in FIG. 10. The buildings 1010 and the spaceship 1008 may be printed art, and the translucency of the rapidly moving structure as it cycles back and forth permits the buildings 1010 behind it to be at least partially visible. Thus, to the player, it appears as if elements 1006 (shown as numbers in FIG. 10) are being projected in front of the buildings 1010. On the secondary display 1004, a basic game is shown with symbol-bearing reels and pay lines.

A scrolling indicia feature is triggered on the gaming machine 1000 when a start-bonus symbol is displayed across a pay line or when a predetermined combination of symbols are displayed across a pay line. During "basic" game play, the elements 1006 do not appear. Upon triggering of the scrolling indicia feature, the spaceship 1008 will "light up" his laser to display a series of numbers 1006 below his spaceship. The CPU of the gaming machine 1000 selectively illuminates display elements on a rapidly moving structure in the top display assembly 1002 to display the elements 1006. The scrolling may begin automatically or in response to an action by the player (e.g., pressing a "start" button). During scrolling, the elements 1006 appear to scroll from right to left (or left to right). The elements that appear in the box shown in FIG. 10 when the scrolling stops are associated with a possible award.

The elements 1006 may be digits ranging from 0 to 9 as illustrated, but in alternate embodiments, may take forms other than the illustrated digits, including but not limited to symbols including arithmetic symbols, playing cards, shapes, puzzle pieces, colors, or other indicia. If the elements 1006 are symbols, for example, the award may be based on the middle three symbols and the numbers which match each other. The symbols may be thematic symbols or such traditional reel symbols as 7, 1 bar, 2 bar, 3 bar, bell, cherry, and/or various fruits. If the elements 1006 are playing cards, the award may be based on the middle three playing cards and the rank of the poker hand created with the three cards.

The elements 1006 are preferably arranged in a repeating fixed sequence such that the first element in the sequence re-appears after the last element in the sequence. The CPU, such as the CPU 104, may randomly select the fixed sequence of the elements 1006 and the outcome of the scrolling indicia feature at the start of the scrolling indicia feature.

The number of elements 1006 in the sequence is preferably far greater than the number visible on the display 1002 at any given moment. For example, the number of elements 1006 in the sequence may be twenty-seven, while the number visible on the display 1002 at any given moment is thirteen. Therefore, only a part of the sequence of elements 1006 is visible on the display 1002 at any given moment. Alternatively, the entire sequence of elements 1006 may be visible on the display 1002 at any given moment.

A middle portion of the visible part of the sequence of the elements 1006 is associated with a possible award. This middle portion is displayed differently, e.g., larger, a different color, or highlighted in some manner, from a remainder of the sequence. The number of elements 1006 in the middle portion may, for example, be three such that, at any given moment, the display 1002 generally depicts a total of thirteen elements consisting of the three middle elements and a set of five elements on each side of the three middle elements.

In the illustrated embodiment, the middle portion is shown as a box with a set of three elements on each side of the three middle elements inside the box (shown as numbers 3, 8, and 2), for a total of nine elements 1006. The elements in the middle portion also appear to be larger than the other elements not in the middle portion. Note that fewer or more than three elements may appear in the middle portion.

The sequence of elements 1006 may be scrolled across the display 1002 in a linear or curvilinear manner. If scrolled in a linear manner as illustrated, the sequence of elements 1006 may be scrolled horizontally as illustrated, vertically, diagonally, or some other direction or combination of directions. Furthermore, if the display 1002 is a 3D display or a volumetric 3D display, for example, the sequence of elements 1006 may be scrolled in any conceivable manner in a spatial volume.

The scrolling indicia feature provides an award based on the portion of the sequence that is displayed differently (e.g., larger and a different color) when the scrolling stops. The sequence of elements 1006 preferably scrolls across the display 1002 for one or more iterations of the sequence so that each element of the sequence appears at least once on the display 1002. For the sake of simplicity of explanation, however, suppose the scrolling stops with the three digits, "3 8 2", in FIG. 10 yielding the award. If the elements 1006 are digits as illustrated, the award may be based on a multi-digit number formed by the middle three digits and, more specifically, may be a credit amount (e.g., 382 credits) corresponding to this number. Alternatively, the award may be based on an arithmetic expression including the middle three digits, such as addition of the digits (e.g., 13 credits=3+8+2) or multiplication of the digits (e.g., 48 credits=3×8×2). In another alternative embodiment, arithmetic symbols such as +, −, and × are interleaved between the digits and the award is based on the result of the arithmetic expression (e.g., 26 credits=3×8+2).

The rate at which the sequence of elements 1006 scrolls across the display 1002 may be controlled to create a sense of anticipation and excitement. For example, the rate of scrolling may be gradually increased to a fixed velocity, maintained at the fixed speed for a few seconds, and then gradually decreased until stopping the scrolling altogether. Alternatively, the rate of scrolling may fluctuate several times between increasing and decreasing to further tease the player.

It should be understood that although the scrolling indicia feature has been described herein in connection with FIG. 10, the scrolling indicia feature may be employed in connection with any gaming machine described in connection with any embodiment herein.

Figure 11A:
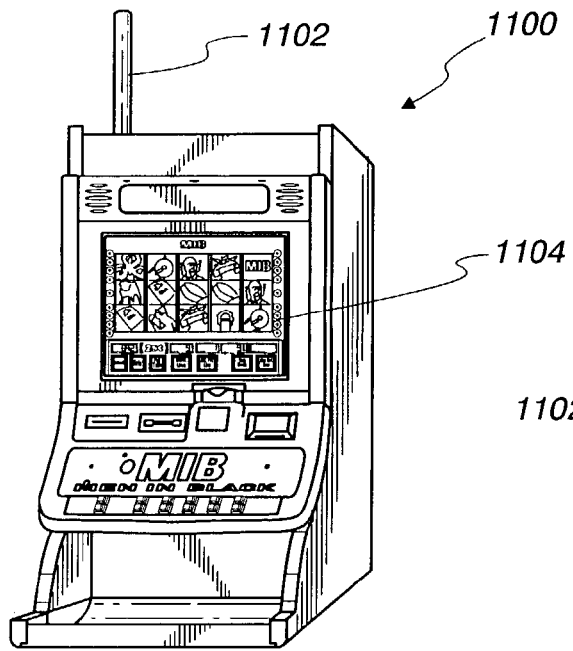
FIG. 11a is an illustration of part of the gaming machine shown in FIG. 10 showing a POV wand at rest according to an embodiment of the present invention.
Figure 11B:
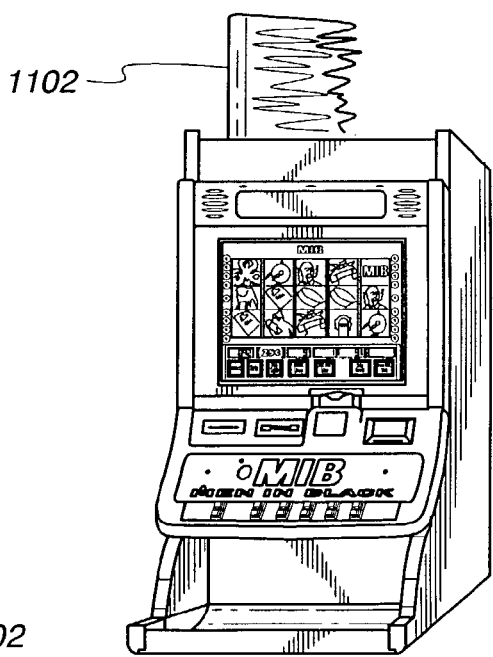
FIG. 11b is an illustration showing the POV wand shown in FIG. 11a in a cyclical motion.
Figure 11C:
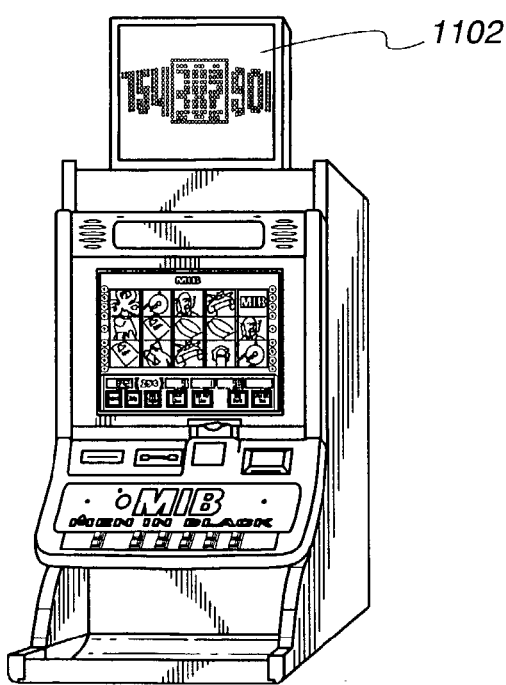
FIG. 11c is an illustration showing the POV wand of FIG. 11a simulating an image by rapidly moving back and forth.

FIGS. 11*a* through 11*c* illustrate a rapidly moving structure 1102 in action. A top box portion of a gaming machine 1100 is shown with a rapidly moving structure 1102 mounted as shown. The rapidly moving structure 1102 has a wand shape and moves rapidly back and forth in a cyclical fashion across the top of the gaming machine 1100 as shown in FIG. 11*b*. As the lighting elements on the rapidly moving structure 1102 are selectively illuminated, an image appears as shown in FIG. 11*c*.

As mentioned above, the rapidly moving structure may be in the shape of a hoop, which may be ovular, circular, or polygonal, incorporating lighting elements about its periphery. There may be one or more hoops assembled together which rotate rapidly about an axis.

A hoop-shaped rapidly moving structure may be incorporated into the top box of a gaming machine or may be used as the secondary display. Like the wand, the hoop is translucent when in motion, permitting objects to be placed inside of the hoop. For example, a moving pointer is placed inside of the hoop to interact with animated images outside of the hoop. Alternately, a spinning mechanical reel may be placed within the hoop. The text or animations displayed by the hoop modify values or results that appear when the mechanical reel stops.

Figure 12A:
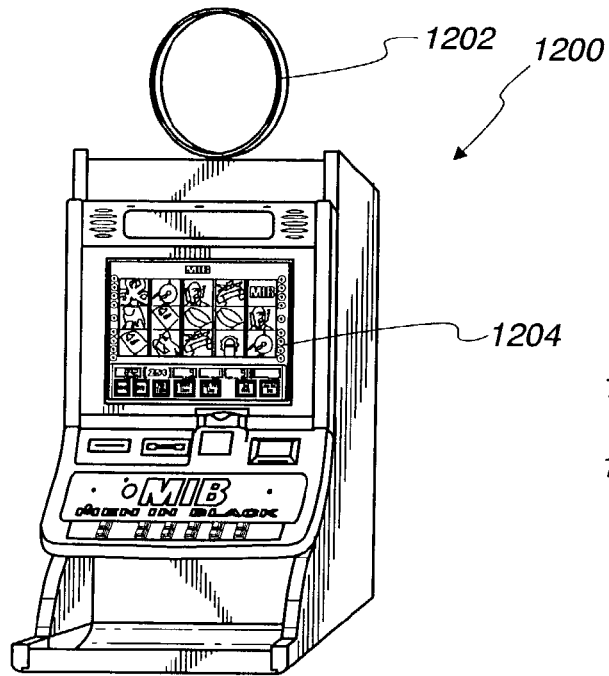
FIG. 12a is an illustration of part of the gaming machine shown in FIG. 10 showing a POV hoop at rest according to an embodiment of the present invention.
Figure 12B:
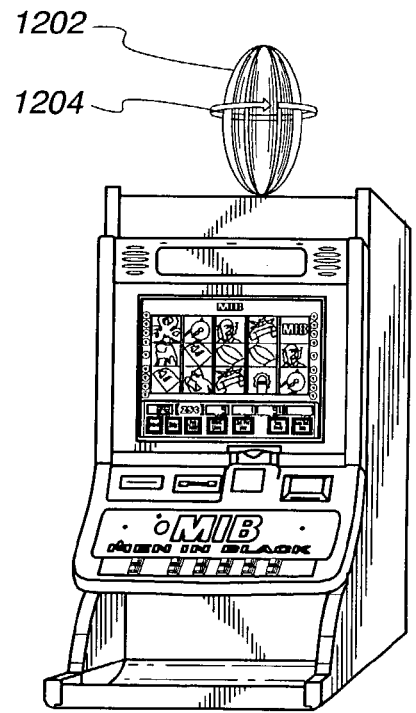
FIG. 12b is an illustration of the POV hoop shown in FIG. 12a spinning about an axis.
Figure 12C:
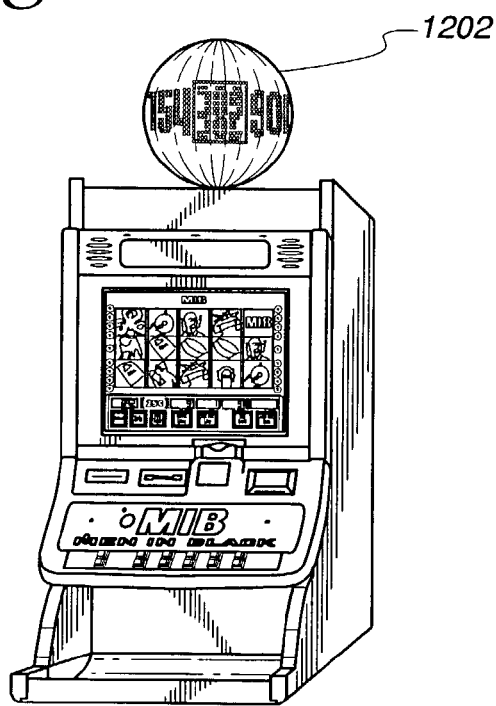
FIG. 12c is an illustration of the POV hoop shown in FIG. 12a simulating an image by rapidly spinning about an axis.

FIGS. 12*a* through 12*c* illustrate a hoop-shaped rapidly moving structure 1202 in varying degrees of movement. In FIG. 12*a*, the rapidly moving structure 1202 is shown at rest atop a top box portion of a gaming machine 1200 which includes a secondary display 1204. In FIG. 12*b*, the rapidly moving structure 1202 is set into a circular motion about its axis in direction 1204, which is illustrated for ease of discussion. At the same time, the lighting elements disposed about the periphery of the rapidly moving structure 1202 are selectively turned on and off through software until the desired imagery is displayed, such as that shown in FIG. 12*c*. Here, the visual effect of the hoop-shaped rapidly moving structure 1202 is nearly the same as the visual effect of the wand-shaped rapidly moving structure 1102, except that the numbers centrally displayed by the hoop-shaped rapidly moving structure 1202 will appear to be closer to the player than the numbers peripherally displayed. That is, the centrally displayed numbers will appear to "curve" toward the viewer. Note that a similar effect is obtainable using a wand-shaped rapidly moving structure by moving it in a circular path.

III. Gaming Machine Including a 3D Display

A. True 3D Displays a. Volumetric 3D Display

The second category of displays is referred to herein as 3D displays. True 3D displays display imagery that fills a spatial volume and each unit or element in that volume is called a voxel. One such true 3D display is the volumetric 3D display shown and described in connection with FIGS. 2*a*-3.

b. Multi-Layer Display

Figure 13:
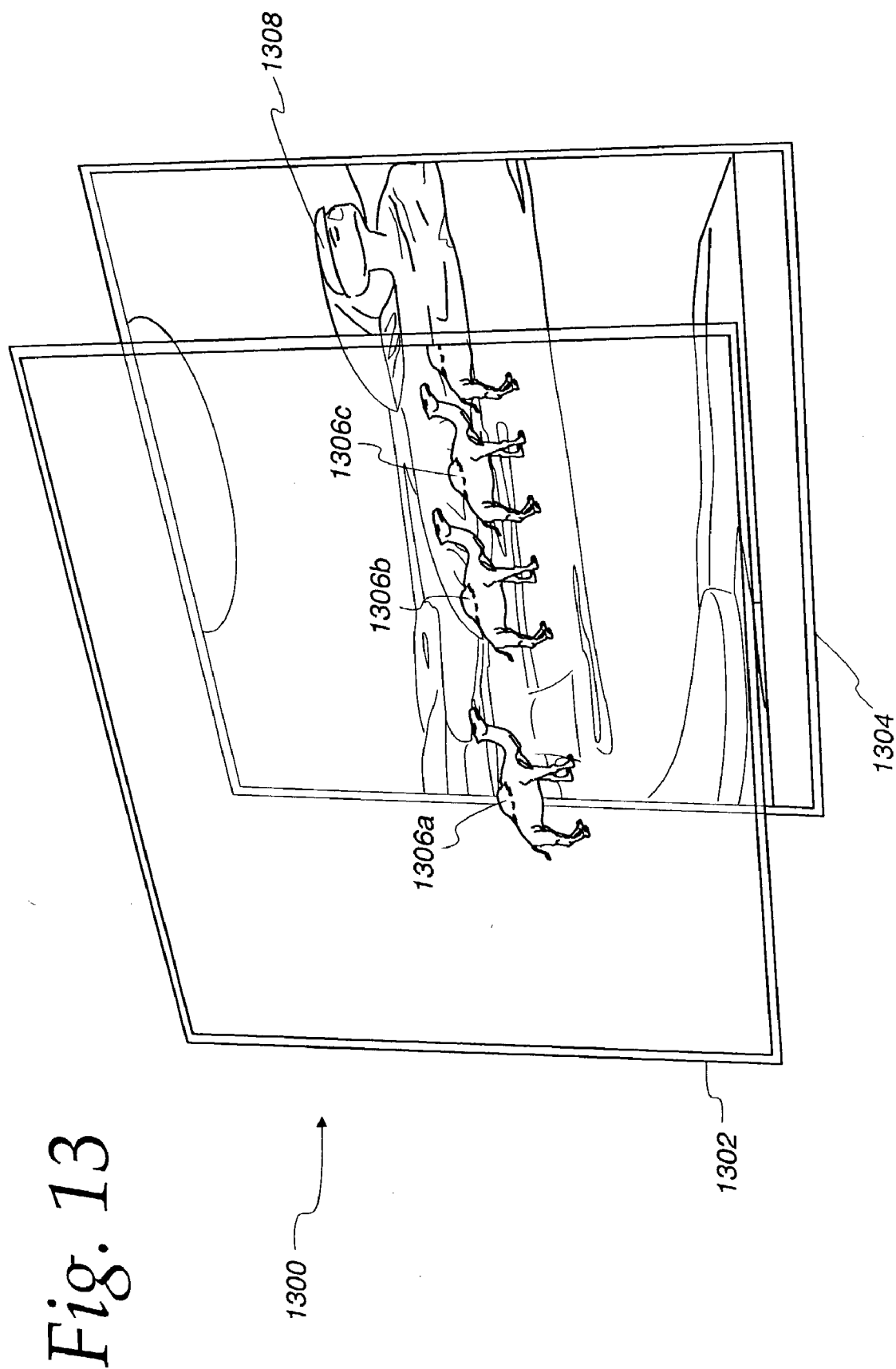
FIG. 13 is an exploded view of part of a multi-layer display which is used in a gaming machine according to the present invention.

Another type of true 3D display is a multi-layer display 1300 shown in FIG. 13 in an exploded view. The multi-layer display 1300 includes a first display layer 1302 and a second display layer 1304 each of which are sufficiently transparent to permit the second display layer 1304 to be visible through the first display layer 1302. In an embodiment, the first and second display layers 1302, 1304 are of the color, active matrix, liquid crystal type. The desert scene depicted in the gaming machines shown in FIGS. 4-7 includes foreground elements 1306*a,b,c* displayed on the first display layer 1302 and background imagery 1308 displayed on the second display layer 1304. Note that the secondary displays shown and described in connection with FIGS. 4-7 may be multi-layer displays such as the multi-layer display 1300 shown in FIG. 13 with an optional touchscreen overlaying the first display layer 1302.

Multi-layer displays suitable for use in the present invention are commercially available from at least Deep Video Imaging™. Manufacturers of video controllers suitable for use with multi-layer displays available from Deep Video Imaging™ include Appian Graphics, ATI Technologies, Inc, Matrox, nVidia, and Peritek Corporation for the Microsoft® Windows®, Apple® Macintosh®, Linux, BeOS, OS/2, and Solaris™ operating system platforms.

In another embodiment, a multi-layer display includes three liquid crystal layers which are independently controlled by a CPU such as CPU 104 in FIG. 1. An infrared or imaging device is mounted on the cabinet of a gaming machine, and is controlled by a controller such as CPU 104 in FIG. 1 to track a characteristic associated with a player, such as the player's position, angle, or movement. The controller uses the position and movement information provided by the infrared or imaging device to manipulate the three liquid crystal layers creating a 3D effect regardless of the angle at which the player is viewing the display. In addition, a 3D motion effect can be created as a player moves. For example, to "see" around an object, a player might move his head to the left or right, and as he does, the graphics displayed on the three layers are conventionally adjusted so that the imagery obscured by the object from one angle become visible to the player when viewed from the new angle. In addition, previously obscured details of the object may also be made visible (motion parallax), thus more closely approximating real-world observation of 3D objects.

In an embodiment, the infrared or imaging device is also used to track the time a player is in front of the gaming machine. The gaming machine also keeps track of the player's interaction with the wagering game, and combines the data from the infrared or imaging device to calculate the "time played" and "time wasted" by a player for demographics studies, and the like. For example, this tracking feature may be exploited in a new wagering game to assess its attractiveness to players before full-scale release.

Although a two- and three-layer multi-layer display has been described herein, the present invention also contemplates any multi-layer display having more than three layers.

c. Holographic Display

A third type of true 3D display is holographic display, also known as a holovideo display. Displaying a 3D holographic image generally requires two processes, a computational process in which a 3D description is converted into a holographic fringe pattern, and an optical process in which light is modulated by the fringe to produce a 3D image.

The computational process involves a rendering stage and a holographic fringe generation stage. The rendering stage involves spatially transforming polygons, lighting, occlusion processing, shading, and in some cases, rendering to 2D images. Note that if the 3D description already exists as 3D voxels, the rendering stage is unnecessary. The fringe generation stage computes a 2D holographic fringe based on the data from the rendering stage. These two computing stages can be linked under an interference-based or diffraction-specific approach, both of which are known in the art.

Figure 14A:
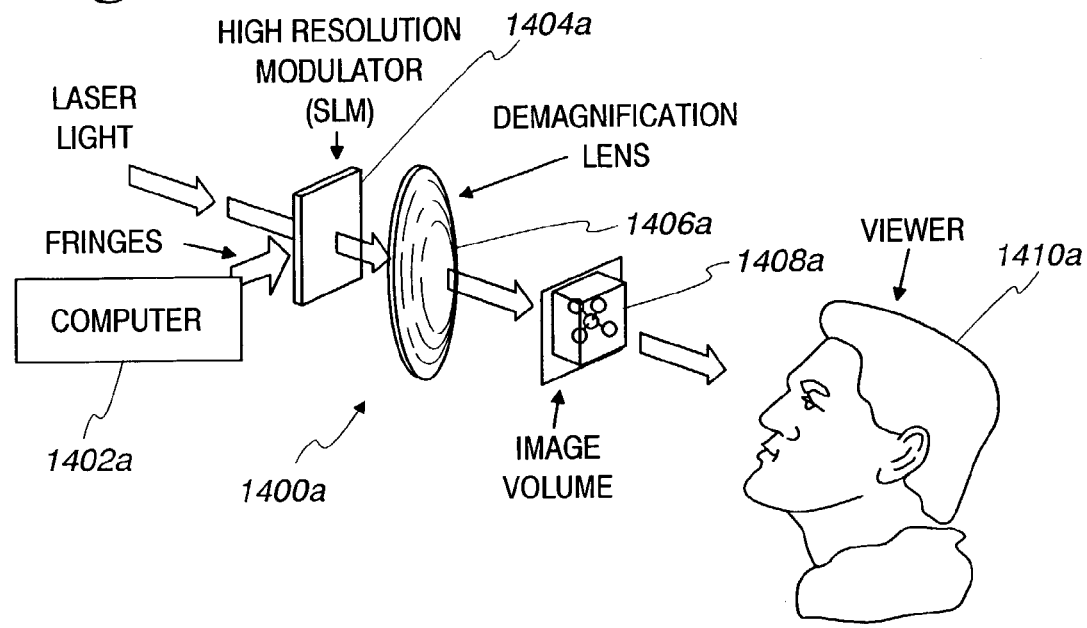
FIG. 14a is an exploded functional diagram of the primary components of a holographic display used in a gaming machine according to an embodiment of the present invention.
Figure 14B:
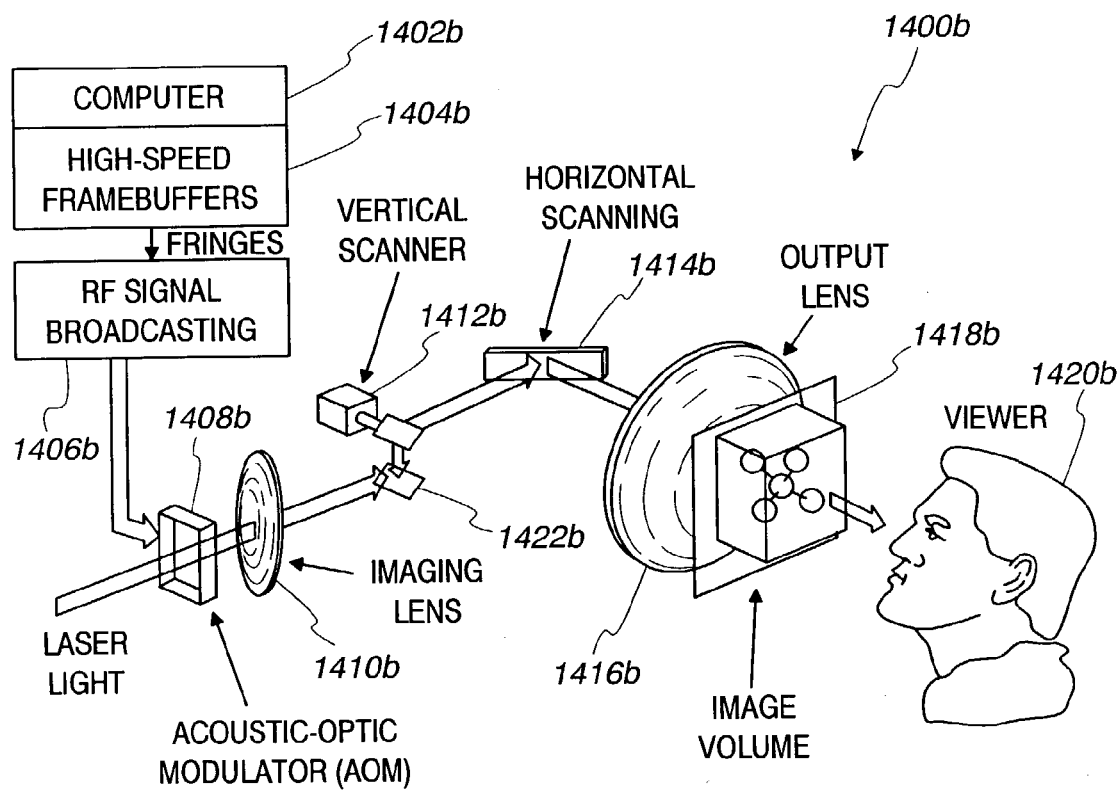
FIG. 14b is an exploded functional diagram of the primary components of a holographic display used in a gaming machine in accordance with another embodiment of the present invention.

The second process is optical modulation and processing. Two holographic modulation techniques are illustrated in FIGS. 14*a* and 14*b*, though all other techniques known in the art are contemplated by the present invention. FIG. 14*a* is a functional block diagram of a holographic optical modulation technique using a high-resolution spatial light modulator (SLM), and FIG. 14*b* is a functional block diagram of a holographic optical modulation technique using a scanned acousto-optic modulator (AOM).

The SLM-based holographic optical modulation technique uses an optical modulation assembly 1400*a* which generally includes a computer 1402*a*, a high-resolution SLM 1404*a*, and a demagnification lens 1406*a*. The holographic fringe patterns generated in the computational process are provided by the computer 1402*a* to the SLM 1404*a*. The digital data provided by the computer 1402*a* is converted to corresponding photons by modulating light with a computed holographic fringe using the SLM 1404*a*. The modulated photons are passed through the demagnification lens 1406*a* to compensate for the disparity between the fringe sampling pitch (typically about 0.5 microns wide) and the modulation elements in the SLM (typically about 50 microns wide). In an embodiment, the SLM 1404*a* is a liquid crystal display, which operates as a phase modulator. In another embodiment, the SLM 1404*a* is a deformable micromechanical mirror device. The de-magnified, modulated photons display a 3D image 1408*a* to a viewer 1410*a*.

The AOM-based holographic optical modulation technique uses an optical modulation assembly 1400*b* which generally includes a computer 1402*b*, an AOM 1408*b*, an imaging lens 1410*b*, a vertical scanner 1412*b*, a horizontal scanning system 1414*b*, and an output lens 1416*b*. The computed fringes stored in the high-speed frame buffers 1404*b* of the computer 1402*b* are RF processed in an RF signal broadcasting system 1406*b* to traverse the wide aperture of the AOM 1408*b* as acoustic waves. The AOM 1408*b* phase-modulates a beam of laser light into diffracted light which is imaged and de-magnified by the imaging lens 1410*b* and output lens 1416*b*, respectively, at a plane in front of a viewer 1420*b*. The horizontal scanning system 1414*b* angularly multiplexes the image of the modulated light, and a vertical scanning mirror 1422*b* reflects diffracted light to the correct vertical position in the hologram plane. In an embodiment, the AOM 1408*b* is a three-channel (R,G,B) tellurium-dioxide Acousto-Optic Modulator.

Holographic displays are available from at least Icon International Images, Inc., d/b/a 3Dmirage, and Kingmaker in the United Kingdom. Other holographic displays, such as the Mark-I and the Mark-II, have been developed by the Spatial Imaging Group at the MIT Media Lab.

Figure 15:
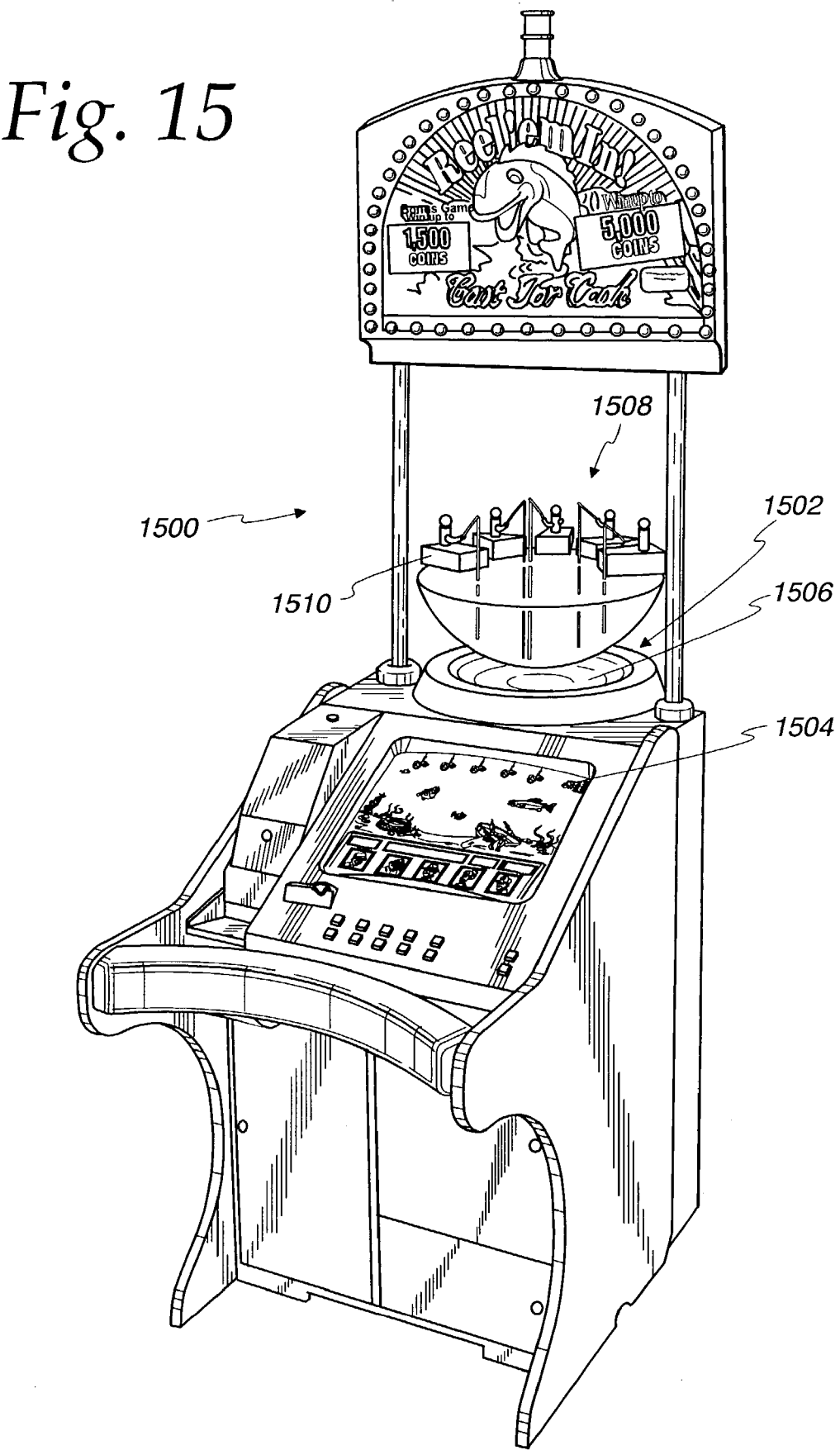
FIG. 15 is a perspective view of a gaming machine having a holographic display displaying a bonus game to a player according to an embodiment of the present invention.

FIG. 15 is a perspective view of a gaming machine 1500 having a holographic display 1502 that displays a 3D holographic image 1508 through a lens 1506. The holographic image 1508 is part of the Reel'em In!® bonus game described in connection with FIG. 3. Note that the player could actually pass a hand through the holographic image 1508. In another embodiment, the holographic image is projected onto a holographic film. A secondary display 1504 may display the second part of a unified image associated with a bonus game or it may display a basic game or a help/information screen.

B. Virtual/Stereoscopic 3D Displays a. Autostereoscopic Display

Autostereoscopic displays present a true or perceived 3D image to a viewer without the need for glasses, goggles, or other potentially encumbering viewing aids. Autostereoscopic displays that present a true 3D image have been described above, such as volumetric 3D displays, multi-layer displays, and holographic displays. The following discussion focuses on autostereoscopic displays that present a so-called virtual 3D image which is actually a 2D image that is perceived by the viewer to be a 3D image. In this category, two types of autostereoscopic displays will be discussed: lenticular displays, which are a type of parallax display, and parallax illumination displays which use light lines to create a parallax effect.

FIGS. 16a and 16b illustrate two types of lenticular displays. In FIG. 16a, part of a lenticular display 1600a is shown having cylindrical lenslets 1602a which are optically aligned over an image layer 1604a, such as a liquid crystal layer, through which image data is emitted. Each lenslet 1602a focuses on the image data emitted through it and directs the light in different directions. The image data represents imagery destined for the right and left eyes which have been interleaved together. As the light representing the interleaved imagery is emitted through the lenslets 1602a, it is directed such that the imagery for the right eye reaches the right eye, and the imagery for the left eye reaches the left eye. The viewer's brain fuses the left and right imagery together to form an impression of depth. The image layer 1604a may also be a CRT or other 2D display.

Lenticular displays create a horizontal parallax effect only. Another type of lenticular display, also called an integram, uses spherical lenslets instead of cylindrical ones to present horizontally and vertically varying directional information, thus producing a full parallax image. Part of a lenticular display 1600b having spherical lenslets 1602b optically aligned over an image layer 1604b is shown in FIG. 16b. The spherical shape of the lenslets 1602b permits the light emitted by the image layer 1604b to be directed in both horizontal and vertical directions. As with the cylindrical lenticular display, the image layer 1604b may be part of a liquid crystal display, a CRT, or any other 2D display.

Lenticular displays are available from numerous manufacturers, including for example Sharp, Philips, Sanyo, Samsung, Zeiss, SeeReal Technologies GmbH under the designation Dresden 3D Display (D4D), and StereoGraphics Corporation under the designation SynthaGram™, and have been developed by the University of Dresden and others. A lenticular display may be incorporated into any of the gaming machines described herein and may display either a basic wagering game or a bonus game. A lenticular display may also be used as the secondary display of any of the gaming machines described and in conjunction with any other POV or 3D display discussed herein.

In an embodiment, a gaming machine having a lenticular display tracks a characteristic associated with a player such as the player's position or angle relative to the display using one or more infrared or imaging devices such as a camera. The tracking operates in a similar manner described above in connection with the multi-layer displays. A lenticular display with tracking is available from SeeReal Technologies GmbH under the designation Dresden 3D Display (D4D) in either the CAD version (optical tracking) or the MED version (spot tracking). Note that the infrared or imaging device may be incorporated into the display or into the cabinet of the gaming machine. The tracking embodiments described herein may be used in connection with any of the displays and any of the gaming machines described herein.

The second type of autostereoscopic display in the virtual 3D display category is a parallax illumination display 1700, a part of which is shown in FIG. 17a. The parallax illumination display 1700 includes a transparent display layer 1702 disposed in front of an illumination plate 1704 containing columns of light lines which can be selectively turned on or off. When turned on, the light lines are observed by a viewer 1710 shown in FIG. 17b through the columns of pixels on the transparent display layer 1702. Left-eye and right-eye views of the same imagery are interleaved and displayed on the pixel columns and each eye observes the imagery from slightly different angles because of binocular disparity caused by the distance between two eyes. The slight angular displacement creates a perceived 3D effect. Note that the illumination plate 1704 can be turned off to display in 2D mode.

Parallax illumination displays are presently commercially available from Dimension Technologies, Inc. under the designations 2018XLQ and 1015XLS and work with any graphics card using the well-known nVidia chipset. A parallax illumination display may be incorporated into any of the gaming machines described herein and may display either a basic wagering game, a bonus game, or a scrolling indicia feature. Such a display may also be used as the secondary display of any of the gaming machines described and in conjunction with any other POV or 3D display discussed herein.

b. Non-Autostereoscopic

Another type of virtual 3D display is a non-autostereoscopic display which, in contrast to autostereoscopic displays, requires a viewing aid to complete the virtual 3D effect. Many autostereoscopic displays require the viewer to look at the display at a certain angle and within a certain distance in order to enjoy the desired virtual 3D effect, but no such restrictions are found with non-autostereoscopic displays. An example of a non-autostereoscopic display suitable for use with a gaming machine of the present invention is manufactured by Samsung under the designation 3D Hyper Monitor, which includes a glass pane placed between two LCD panels, each reflecting half the light and providing light permeability, creating a 3D effect when the viewer wears special film-coated glasses or goggles.

A non-autostereoscopic display may be incorporated into any of the gaming machines described herein and may display either a basic wagering game or a bonus game. Such a display may also be used as the secondary display of any of the gaming machines described and in conjunction with any other POV or 3D display discussed herein.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game on a gaming machine, comprising:
   selecting a game outcome from a plurality of possible outcomes; and
   displaying the game outcome with imagery generated by a 3D multi-layer video display including a first display layer and a second display layer, said second display layer being generally parallel to and physically separated from said first display layer, said first display layer portraying at least one foreground display element, said second display layer portraying a background image, said foreground display element and said background image moving relative to each other such that at least one of said foreground display element and said background image appears to scroll across a player's field of vision.

2. The method of claim 1, wherein said imagery is true 3D imagery.

3. The method of claim 1, wherein the wagering game is selected from a group consisting of slots, poker, keno, bingo, blackjack, and roulette.

4. A method of conducting a wagering game on a gaming machine, comprising:

selecting a game outcome from a plurality of possible outcomes; and displaying the game outcome with imagery generated by a true 3D multi-layer video display including a first display layer and a second display layer, said second display layer being generally parallel to and physically separated from said first display layer, said first display layer portraying at least one foreground display element, said second display layer portraying a background image, said foreground display element and said background image moving relative to each other such that at least one of said foreground display element and said background image appears to scroll across a player's field of vision.

5. The method of claim 4, wherein said imagery is volume-filling imagery defined by a plurality of voxels.

6. The method of claim 5, wherein said at least one foreground display element includes a first display element and a second display element, said first display element and said second display element being in said first display layer, a third display element being in said second display layer.

* * * * *